United States Patent
Ma et al.

(10) Patent No.: US 12,082,527 B2
(45) Date of Patent: Sep. 10, 2024

(54) AUTONOMOUS WORKING APPARATUS

(71) Applicant: SHANGHAI SUNSEEKER ROBOTIC TECHNOLOGY CO., LTD., Shanghai (CN)

(72) Inventors: Miaowu Ma, Shanghai (CN); Jian Xiong, Shanghai (CN)

(73) Assignee: SHANGHAI SUNSEEKER ROBOTIC TECHNOLOGY CO., LTD., Shanghai (CN)

( * ) Notice: Subject to any disclaimer, the term of this patent is extended or adjusted under 35 U.S.C. 154(b) by 191 days.

(21) Appl. No.: 17/424,744

(22) PCT Filed: Nov. 22, 2020

(86) PCT No.: PCT/CN2020/130710
§ 371 (c)(1),
(2) Date: Jul. 21, 2021

(87) PCT Pub. No.: WO2021/098867
PCT Pub. Date: May 27, 2021

(65) Prior Publication Data
US 2022/0272895 A1    Sep. 1, 2022

(30) Foreign Application Priority Data

Nov. 22, 2019   (CN) .......................... 201911158505.X
Nov. 29, 2019   (CN) .......................... 201911207649.X
(Continued)

(51) Int. Cl.
*A01D 34/74*   (2006.01)
*A01D 34/00*   (2006.01)
(Continued)

(52) U.S. Cl.
CPC .......... *A01D 34/74* (2013.01); *A01D 34/008* (2013.01); *A01D 34/64* (2013.01); *A01D 34/733* (2013.01); *A01D 2101/00* (2013.01)

(58) Field of Classification Search
CPC ...... A01D 34/008; A01D 34/54; A01D 34/58; A01D 34/64; A01D 34/74; A01D 2101/00; G05D 1/0088
(Continued)

(56) References Cited

U.S. PATENT DOCUMENTS 10,716,254 B2 *  7/2020  Song .................... A01D 34/736
11,154,005 B2 * 10/2021  Hong .................... A01D 69/02
(Continued)

FOREIGN PATENT DOCUMENTS

CN    104823599 A    8/2015
CN    106605488 A    5/2017
(Continued)

OTHER PUBLICATIONS

International Search Report and Written Opinion dated Feb. 24, 2021, for International Patent Application No. PCT/CN2020/130710.
(Continued)

*Primary Examiner* — Jason S Daniels
(74) *Attorney, Agent, or Firm* — KARCESKI IP LAW, PLLC

(57) ABSTRACT

An autonomous working apparatus includes a main body mechanism, a moving mechanism, a working mechanism and a control module. The main body mechanism includes a support body, and the working mechanism is configured to be installed on the support body. The working mechanism has an operating member and a height variable mechanism. The height variable mechanism is configured to be movably connected with the operating member. The operating mem-
(Continued)

ber is configured to be rotatably connected to the support body, and the operating member is configured to operatably drive the height variable mechanism to move along the height adjustment direction. The force between the operating member and the height variable mechanism is caused by the gravity of the height variable mechanism, and the force between the operating member and the support body is caused by the gravity of said operating member and of said height variable mechanism.

18 Claims, 9 Drawing Sheets

(30) Foreign Application Priority Data

| | | |
|---|---|---|
| Jan. 21, 2020 | (CN) | 202010068590.7 |
| Jan. 21, 2020 | (CN) | 202020143444.1 |
| Jan. 21, 2020 | (CN) | 202020143445.6 |
| Mar. 4, 2020 | (CN) | 202010143005.5 |
| Mar. 4, 2020 | (CN) | 202020255453.X |
| Mar. 4, 2020 | (CN) | 202020255454.4 |
| Mar. 4, 2020 | (CN) | 202020256831.6 |
| Mar. 4, 2020 | (CN) | 202020256834.X |

(51) Int. Cl.
 *A01D 34/64* (2006.01)
 *A01D 34/73* (2006.01)
 *A01D 101/00* (2006.01)

(58) Field of Classification Search
 USPC .......................................................... 56/17.1
 See application file for complete search history.

(56) References Cited

U.S. PATENT DOCUMENTS

| | | | | |
|---|---|---|---|---|
| 11,350,564 | B1* | 6/2022 | Hoyda | A01D 34/828 |
| 11,805,728 | B2* | 11/2023 | Watanabe | A01D 34/78 |
| 2012/0023880 | A1* | 2/2012 | Messina | B60L 3/0061 |
| | | | | 901/1 |
| 2017/0181375 | A1* | 6/2017 | Hashimoto | A01D 34/74 |
| 2023/0320269 | A1* | 10/2023 | Curtis | A01D 34/64 |
| | | | | 56/10.2 A |

FOREIGN PATENT DOCUMENTS

| | | | | |
|---|---|---|---|---|
| CN | 206533741 U | 10/2017 | | |
| CN | 207382902 U | 5/2018 | | |
| CN | 111183784 A | 5/2020 | | |
| EP | 3342270 A1 | 7/2018 | | |
| EP | 3549429 A1 * | 10/2019 | | A01D 34/001 |
| FR | 2660149 A1 | 10/1991 | | |

OTHER PUBLICATIONS

Extended European Search Report dated Jan. 3, 2024, for European Patent Application No. 20890453.2.

\* cited by examiner

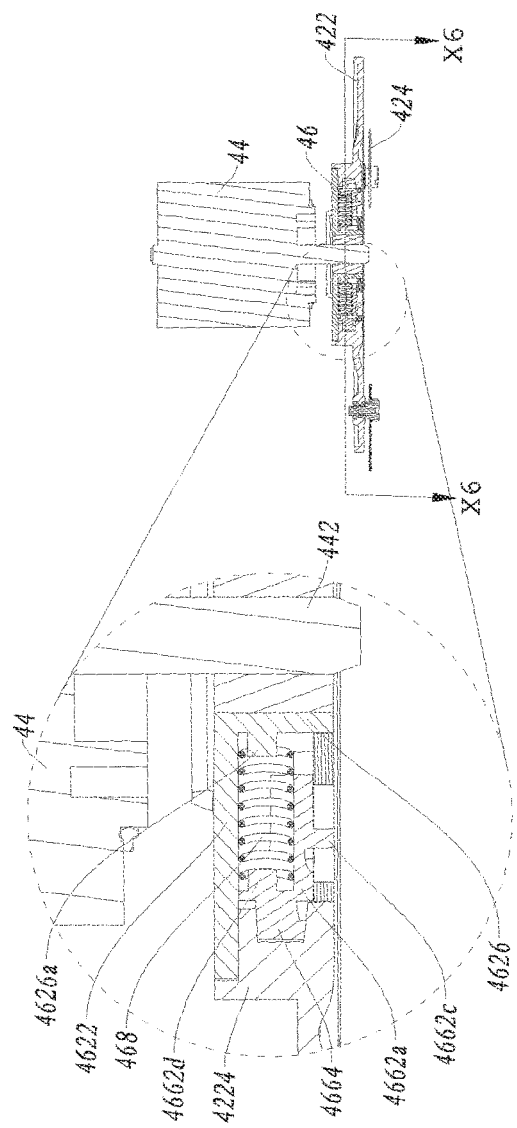
FIG. 27
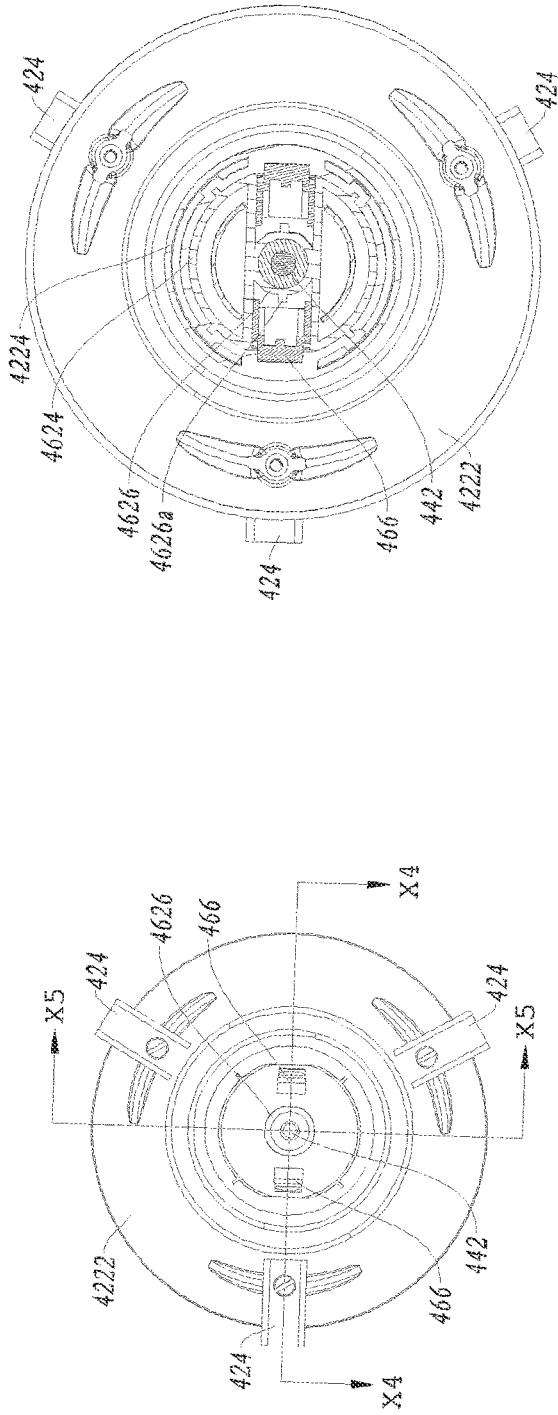
FIG. 28
FIG. 26

AUTONOMOUS WORKING APPARATUS

CROSS-REFERENCE TO RELATED APPLICATION(S)

This is a National Stage Entry into the United States Patent and Trademark Office from International Patent Application No. PCT/CN2020/130710, filed on Nov. 22, 2020, which claims priority to the following applications: Chinese Patent Application No. CN 201911158505.X, filed on Nov. 22, 2019; Chinese Patent Application No. CN 201911207649.X, filed on Nov. 29, 2019; Chinese Patent Application No. CN 202010068590.7, filed on Jan. 21, 2020; Chinese Patent Application No. CN 202020143445.6, filed on Jan. 21, 2020; Chinese Patent Application No. CN 202020143444.1, filed on Jan. 21, 2020; Chinese Patent Application No. CN 202010143005.5, filed on Mar. 4, 2020; Chinese Patent Application No. CN 202020256831.6, filed on Mar. 4, 2020; Chinese Patent Application No. CN 202020255454.4, filed on Mar. 4, 2020; Chinese Patent Application No. CN 202020255453.X, filed on Mar. 4, 2020; and Chinese Patent Application No. CN 202020256834.X filed on Mar. 4, 2020, the entire contents of all of which are incorporated herein by reference.

FIELD OF THE INVENTION

Example embodiments generally relate to the field of outdoor working apparatus, particularly relate to autonomous working apparatus, further particularly relate a robotic lawn mower.

BACKGROUND OF THE INVENTION

It is known that the cutting height can be adjusted by changing the height of the cutting blade in relation to the ground when using the mower. The robotic mower is a lawn mower capable of autonomous working. Since no manual intervention is required, when the robotic mower is working, if the ground is uneven or there are protruding obstacles, the cutting unit in the lowest position of the chassis will be subjected to a large upward impact and will get stuck on the uneven ground or obstacles, resulting in the robotic mower's progress being blocked or even the cutting unit being damaged.

SUMMARY OF THE INVENTION

The technical problem to be solved by the present invention is to provide a working mechanism to solve the problem that the cutting unit of existing robotic lawn mower is prone to stalling or damage when working on uneven ground or accidentally touching an obstacle.

Some example embodiments may therefore provide an autonomous working apparatus, comprising a main body mechanism, a moving mechanism, a working mechanism and a control module, characterized in that the main body mechanism comprises a support body, and the working mechanism is configured to be installed on the support body; the working mechanism comprises an operating member and a height variable mechanism, the height variable mechanism is configured to be movably connected with the operating member; the operating member is configured to be rotatably connected to the support body, and the operating member is configured to operatably drive the height variable mechanism to move along the height adjustment direction; wherein the height variable mechanism comprises a height adjustment mechanism and a height-to-be-adjusted mechanism, the height adjustment mechanism is configured to be connected with the height-to-be-adjusted mechanism; wherein the height adjustment mechanism is configured to comprise a connecting member, the connecting member is configured to be movably connected with the support body, and a height adjustment portion is arranged on the connecting member; the height-to-be-adjusted mechanism is configured to be connected with at least one of the connecting member and the height adjustment portion; and the operating member is configured to be movably connected with the height adjustment portion, and the operating member is configured to operatably drive the height adjustment mechanism and thus drive the height adjustment portion to move along the height adjustment direction.

The working mechanism provided by embodiments of the present invention is to a certain extent unconstrained in its upward movement when it is not in the highest position. So when the autonomous working apparatus with this working mechanism encounters a hard object such as a stone protruding from the ground, the height-to-be-adjusted mechanism can be lifted upwards by the force of the protruding hard object, avoiding block or damage due to direct impact.

BRIEF DESCRIPTION OF THE DRAWING(S)

Having thus described the invention in general terms, reference will now be made to the accompanying drawings, which are not necessarily drawn to scale, and wherein:

FIG. 26 is an assembly view of a working component according to an embodiment of the present invention.

FIG. 27 is an X4-X4 sectional view of FIG. 26, wherein the movable member set in a set in the socket groove.

FIG. 28 is an X6-X6 sectional view of FIG. 27, wherein the movable member set in a set in the socket groove.

DETAILED DESCRIPTION OF EMBODIMENT(S) OF THE INVENTION

The present invention will be described in detail below in connection with the specific embodiments shown in the accompanying drawings. However, these embodiments do not limit the present invention, and structural, methodological, or functional modifications made by a person of ordinary skill in the art in accordance with these embodiments are included within the scope of protection of the present invention.

It is to be understood that in the description of specific embodiments of the invention, the terms "first" and "second" are used for descriptive purposes only and are not to be understood as indicating or implying relative importance or implicitly specifying the number of technical features indicated. Thus, features qualified with "first" and "second" may explicitly or implicitly include one or more such features. In specific embodiments of the invention, unless otherwise expressly specified and limited, the first feature "on" or "under" the second feature may include direct contact between the first and second features, or it may include contact between the first and second features not directly but through a separate feature between them. The first and second features may also be in direct contact with each other, or the first and second features may not be in direct contact with each other, but in contact with each other through a separate feature. In specific embodiments of the present invention, the article "a" or "an" means one, two or more, and is not limited to one, unless otherwise expressly specified and qualified.

In specific embodiments of the invention, unless otherwise expressly specified and limited, the terms "connect" is to be understood in a broad sense, e.g. as a fixed connection, as a movable connection, as a detachable connection, or as an integral part; as a direct connection or as an indirect connection through an intermediate medium; as a connection within two elements or as an interaction between two elements. For those of ordinary skill in the art, the specific meaning of the above terms in the context of the present invention may be understood on a case-by-case basis.

Figure 1:
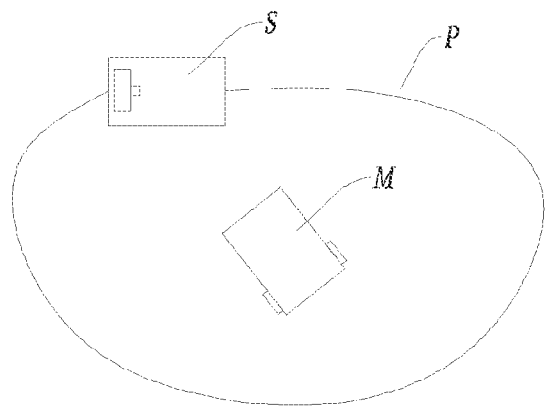
FIG. 1 is a schematic diagram of an autonomous working system according to an embodiment of the present invention.
Figure 2:
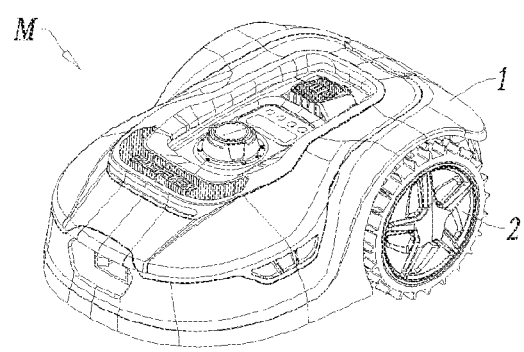
FIG. 2 is a schematic diagram of an autonomous working apparatus according to an embodiment of the present invention.
Figure 3:
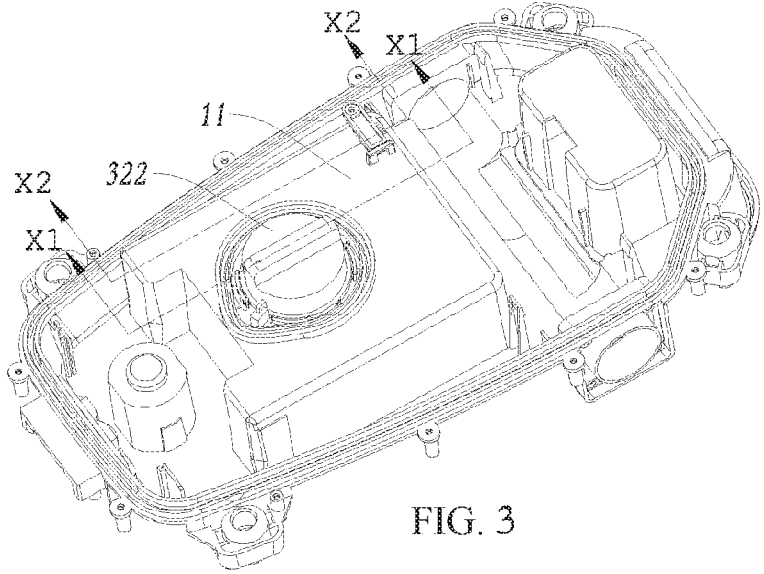
FIG. 3 is a schematic view of a working mechanism according to an embodiment of the present invention.

A typical embodiment of the present invention provides an autonomous work system, with reference to FIG. 1, including an apparatus to be charged and a power supply unit. It is taken as an example for illustration that the apparatus to be charged is configured as an autonomous working apparatus M, and the power supply unit is configured as a docking station S. Usually, the autonomous work system further includes a perimeter P. The autonomous working apparatus M is especially a robot that can autonomously move within a preset area defined by the perimeter P and perform specific operations, such as a robotic sweeper/vacuum cleaner that performs cleaning operations typically, or a robotic lawn mower that perform mowing operations, and so on, wherein the specific operation refers in particular to the treatment of the working surface which results in a change of the condition of the working surface. The present invention is described in detail by taking the robotic lawn mower as an example. The autonomous working apparatus M can autonomously walk on the surface of the working area, especially as the robotic lawn mower, can autonomously perform mowing operations on the lawn. The autonomous working apparatus at least includes a main body mechanism 1, a moving mechanism 2, a working mechanism, an energy source module, a detection module, an interactive module, a control module, and so on.

The main body mechanism 1 usually includes a chassis and a housing. The chassis is used for mounting and accommodating functional mechanisms and functional modules such as the moving mechanism 2, the working mechanism, the energy source module, the detection module, the interactive module and the control module. The housing is usually configured to at least partially cover the chassis, and mainly plays a role of enhancing the aesthetics and identification of the autonomous working apparatus. In this embodiment, the housing is configured to be able to translate and/or rotate resettably relative to the chassis by an external force, and cooperate with an appropriate detection module, such as a Hall sensor, to further serve to sense events such as collision, lift-up, etc.

The moving mechanism 2 is configured to support the main body mechanism 1 on the ground and drive the main body mechanism 1 to move, and usually includes a wheel type mechanism, a track type or half-track type mechanism, or a leg type mechanism, etc. In this embodiment, the moving mechanism 2 is a wheel type mechanism, which includes at least one driving wheel and at least one moving prime motor. The moving prime motor is preferably an electric motor, and in other embodiments, it can also be an internal combustion engine or a machine that uses other types of energy sources to generate power. In this embodiment, the moving mechanism 2 preferably includes a left driving wheel, a left driving prime motor for driving the left driving wheel, a right driving wheel and a right driving prime motor for driving the right driving wheel. In this embodiment, the rectilinear motion of the autonomous working apparatus is realized by the rotation of the left and right driving wheels at the same speed in the same direction, and the steering motion is realized by the rotation of the left and right driving wheels at different speeds in the same direction or opposite rotations. In other embodiments, the moving mechanism 2 can further include a steering mechanism independent of the driving wheel and a steering prime motor independent of the moving prime motor. In this embodiment, the moving mechanism 2 further includes at least one driven wheel, the driven wheel is typically configured as a caster, and the driving wheel and the driven wheel are respectively located at the front and rear ends of the autonomous working apparatus.

The working mechanism is configured to perform specific operations, and includes a working component 4 and a working prime motor for driving the working component 4. Exemplarily, for the robotic sweeper/vacuum cleaner, the working component includes a rolling brush, a dust absorption pipe, a dust collection chamber, and the like; for the robotic lawn mower, the working component 4 includes a cutting blade or a cutting cutting headplate, and further includes other components for optimizing or regulating the mowing effect, such as a height adjustment mechanism for adjusting the mowing height. The working prime motor is preferably an electric motor, and in other embodiments, it can also be an internal combustion engine or a machine that uses other types of energy sources to generate power. In some other embodiments, the working prime motor and the walking prime motor are configured as the same prime motor.

The energy source module is configured to provide energy for various works of the autonomous working apparatus. In this embodiment, the energy source module includes a battery pack and a charging connection structure, wherein the battery pack is preferably a rechargeable battery pack and further preferably a lithium ion battery pack, and the charging connection structure is preferably a charging docking unit that can be exposed at the outside of the autonomous working apparatus. In other embodiments, the charging connection structure can be a wireless charging interface.

The detection module is configured as at least one sensor that senses environmental parameters of the autonomous working apparatus or its own working parameters. Typically, the detection module can include sensors related to the perimeter of the working area, such as magnetic induction, collision, ultrasonic, infrared, radio and other types. The sensor type is adapted to the position and number of corresponding signal generating devices that generate signals to define the limits of the working area. The detection module can further include sensors related to positioning and navigation, such as a GNSS device, a LIDAR device, an electronic compass, an acceleration sensor, an odometer, an angle sensor, and a geomagnetic sensor, etc. The detection module can further include sensors related to its own work safety, such as an obstacle sensor, a lifting sensor, and a battery pack temperature sensor, etc. The detection module can further include sensors related to the external environment, such as an environmental temperature sensor, an environmental humidity sensor, an illumination sensor, and a rain sensor, etc.

The interactive module is configured to at least receive control instruction information input by users, send information needed to be perceived by users, communicate with other systems or apparatus to send and receive information, and so on. In this embodiment, the interactive module includes an input device arranged on the autonomous working apparatus for receiving the control instruction information input by users, typically such as a control panel, and a stop button; and the interactive module further includes a display screen, an indicator light and/or a buzzer, which are arranged on the autonomous working apparatus for enabling the user to perceive information by emitting light or sound. In other embodiments, the interactive module includes a communication module arranged on the autonomous working apparatus and terminal apparatus independent of the autonomous working apparatus, such as a mobile phone, a computer and a network server, etc., and the control instruction information or other user control information can be input on the terminal apparatus and reach the autonomous working apparatus via a wired or wireless communication module.

The control module usually includes at least one processor and at least one non-volatile memory, a computer program or instruction set is pre-written in the memory, and the processor controls the execution of the autonomous working apparatus according to the computer program or the instruction set, such as moving, working and other actions. Further, the control module can also control and adjust corresponding behaviors of the autonomous working apparatus and modify the parameters in the memory according to the signal of the detection module and/or the user control instruction.

The perimeter is used for defining the working area of the autonomous work system, and usually includes an outer perimeter and an inner perimeter. The autonomous working apparatus is limited to move and work within the outer perimeter, beyond the inner perimeter, or between the outer perimeter and the inner perimeter. The perimeter can be physical, typically such as walls, fences and railings, etc. The perimeter can also be non-physical, typically such as an electromagnetic signal or an optical signal sent by a signal generator, or an virtual perimeter of an electronic map formed by two-dimensional or three-dimensional coordinates for the autonomous working apparatus provided with a positioning device (such as GNSS). In this embodiment, the perimeter is configured as a closed energization wire electrically connected with the perimeter signal generating device, and the perimeter signal generating device is usually arranged in the docking station.

The docking station is usually constructed on or within the perimeter for the docking and/or parking of the autonomous working apparatus. In particular, the docking station is provided with a power supply docking unit adapted to the charging docking unit, and when the charging docking unit is docked with the power supply docking unit, the docking station can supply energy to the autonomous working apparatus in the docking station. Usually, the docking station is connected with an external power supply via an external power supply interface, the external power supply can be connected to the national grid or provided as an independent large-capacity battery pack. The "docking" herein should be understood in a broad sense. In the case of contact charging, the docking refers to the formation of a stable electrical connection between the positive electrode of the charging docking unit and the positive electrode of the power supply docking unit, and the formation of a stable electrical connection between the negative electrode of the charging docking unit and the negative electrode of the power supply docking unit; in the case of non-contact charging, typically such as electromagnetic induction wireless charging, the docking refers to that the relative state between the charging docking unit (i.e., a power receiving coil) and the power supply docking unit (i.e., a power supply coil) meets the charging requirements (for example, the relative position relationship meets the charging requirements, and there is no object affecting the charging therebetween), and that stable charging can be realized.

Referring to FIGS. 3-10, one embodiment of the present invention takes the autonomous working apparatus M as an example to describe the working mechanism involved therein in detail. The autonomous working apparatus M provided in this embodiment includes a moving mechanism 2 and a working mechanism that is integrally supported on the moving mechanism 2. Driven by the moving mechanism 2, the working mechanism moves along the traveling direction of the autonomous working apparatus M and performs the mowing work.

The working mechanism is supported on the moving mechanism 2 via a support body. The support body is exemplary configured as at least a part of the main body mechanism 1 of the autonomous working apparatus M, especially the chassis, and further especially a lower chassis cover 11. The chassis includes the lower chassis cover 11 and an upper chassis cover (not shown in the figures) covered on the lower chassis cover 11. The lower chassis cover 11 has a mounting space 12 that is formed by stretching upward and has a downward opening. At least a part of the working mechanism is located in the mounting space 12. A closed space is formed between the upper chassis cover and the lower chassis cover 11, at least a part of the working mechanism is located in the closed space, and at least a part of the working mechanism passes through the upper chassis cover along the thickness direction of the upper chassis cover to reach the upper side of the upper chassis cover. An operator can operate the part of the working mechanism out of the upper chassis cover to control the working mechanism, typically to adjust the height of the working mechanism.

The working mechanism includes an adjustable mechanism 3 that is detachably and movably assembled on the support body, and all or a part of the adjustable mechanism 3 can move in the direction of height adjustment. In this embodiment, the adjustable mechanism 3 naturally presses on the support body from above downwards as a whole, and the assembling is realized by the gravity of the adjustable mechanism 3. That is, when the autonomous working apparatus M is placed on a level ground, the force between the adjustable mechanism 3 and the support body is caused by the gravity of the adjustable mechanism 3, therefore the connecting components between the adjustable mechanism 3 and the support body are mostly simplified, and the structure of the working mechanism is mostly simplified as well.

The adjustable mechanism 3 presses on the support body from above downwards. When the lower part of the adjustable mechanism 3 is subjected to a bottom-up force, there has an space that allow the adjustable mechanism 3 moving upwards, that is, all or a part of the adjustable mechanism 3 can move upwards relative to the support body along the height adjustment direction without being obstructed, therefore the adjustable mechanism 3 can automatically adjust the working height according to the undulation of the working ground. Therefore, on one hand, when the autonomous working apparatus M is working on an uneven ground, the damage to a cutting mechanism caused by the collision between the cutting mechanism and protrusions on the ground can be effectively avoided. On the other hand, the assembling and disassembling of the adjustable mechanism 3 and the support body are facilitated by using their own gravity. During assembling, the operator only needs to place the adjustable mechanism 3 in a corresponding position of the support body and relax it, the adjustable mechanism 3 is naturally in a ready to work state. During disassembling, the operator can detach the adjustable mechanism 3 along a direction opposite to the pressing direction.

In one working mechanism provided in this embodiment, the adjustable mechanism 3 is assembled on the support body without using screws and/or bolts, thus realizing no-threaded-fastener assembling, simplifying the disassembly and assembly process, and minimising the number of parts and the cost. In another working mechanism provided in this embodiment, the adjustable mechanism 3 is assembled by using very few screws, so as to reduce the use of screws as much as possible, simplify the disassembly and assembly process, reduce the number of parts and the cost. In one working mechanism provided in this embodiment, the adjustable mechanism 3 is configured to be able to be integrally assembled and disassembled bare-handedly. That is, without any additional tool, the whole disassembly and assembly process can be completed just by using fingers, so that the whole process is free of tools. In one working mechanism provided in this embodiment, the adjustable mechanism 3 is configured to be able to be mostly assembled and disassembled bare-handedly. That is, with at most one additional tool, the whole disassembly and assembly process can be completed just by using fingers.

The specific disassembly and assembly process will be described in detail in the following embodiments.

The adjustable mechanism 3 includes an operating member 32 and a height variable mechanism 34. When operatably rotating relative to the support body, the operating member 32 can drive the height variable mechanism 34 to move along the height adjustment direction. Wherein, the operating member 32 is configured to be able to generate displacement relative to the support body along the height adjustment direction, thereby driving the height variable mechanism 34 connected thereto to move synchronously, at this time, the height positions of the operating member 32 and the height variable mechanism 34 change synchronously, and the entirety of the adjustable mechanism 3 can be changed relative to the height of the working mechanism. Or, the operating member 32 is configured to be able to generate misplacement relative to the height variable mechanism 34 in the height adjustment direction, thereby changing the height position of the height variable mechanism 34, at this time, the height position of the operating member 32 remains unchanged, and a part of the adjustable mechanism 3 can be changed relative to the height of the working mechanism. Or, by combining the above two solutions, the operating member 32 is configured to be able to generate displacement along the height adjustment direction relative to the support body and the height variable mechanism 34 at the same time. In an preferred embodiment, the operating member 32 is configured to be able to generate misplacement relative to the height variable mechanism 34 in the height adjustment direction, thereby changing the height position of the height variable mechanism 34.

Figure 5:
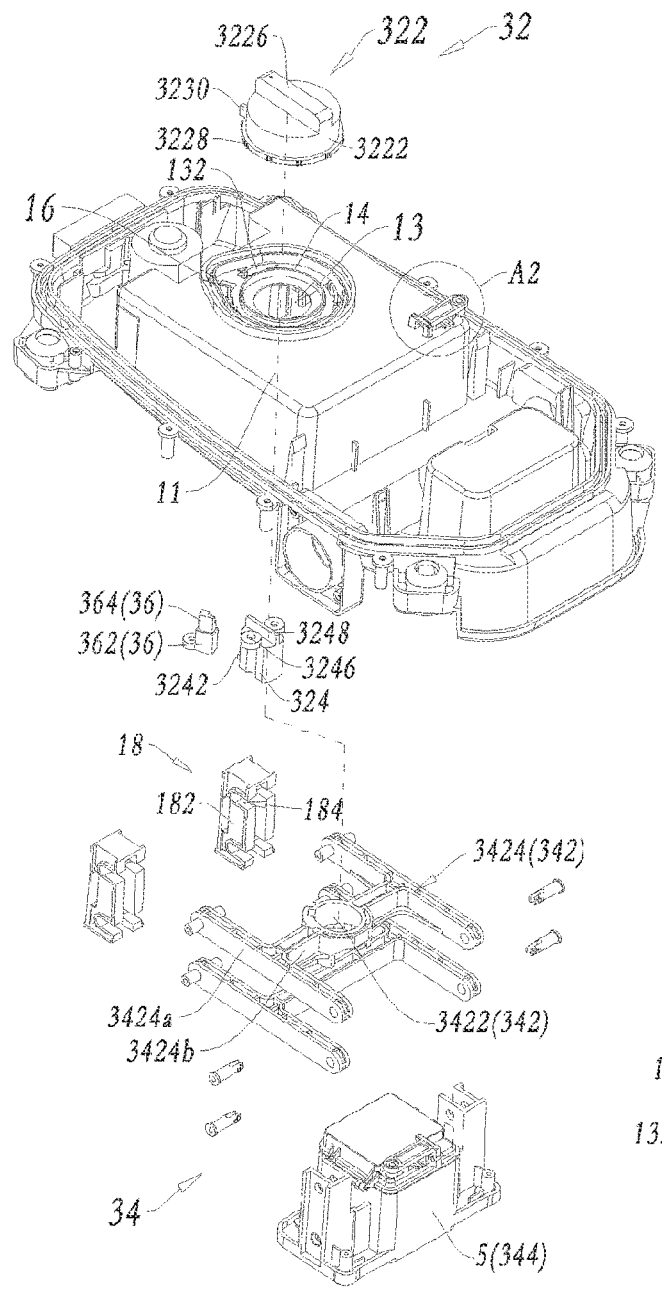
FIG. 5 is a coaxial exploded view of FIG. 3, wherein the cutting plate assembly in the cutting mechanism is omitted.
Figure 6:
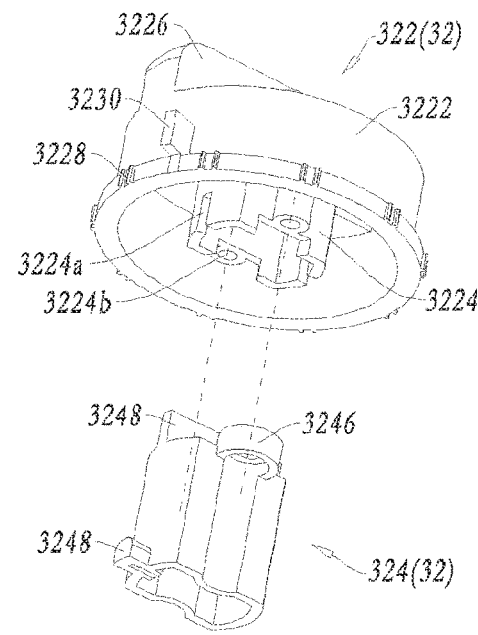
FIG. 6 is an exploded view of an operating knob according to an embodiment of the present invention.

Referring to FIG. 5 and FIG. 6, in the preferred embodiment, the support body is configured with a mounting hole 13 penetrating through the thickness of the support body, and the operating member 32 is detachably and rotatably assembled on the mounting hole 13. The operating member 32 is configured with an edge portion 3222 that can reach the upper edge of the mounting hole 13, and the edge portion 3222 naturally presses on the upper edge of the mounting hole 13 from above downwards, so that the operating member 32 is rotatably assembled on the mounting hole 13, and the operating member 32 can be disassembled from the mounting hole 13 along a direction opposite to the pressing direction.

The center of the operating member 32 is configured with a second connecting portion 3224 that can pass through the mounting hole 13, and the height variable mechanism 34 is located below the support body and is connected to the second connecting portion 3224, so that the operating member 32 presses on the mounting hole 13 due to the gravity of the height variable mechanism 34, that is, when the autonomous working apparatus M is placed on the level ground, the force between the operating member 32 and the support body is caused by the gravity of the operating member 32 and the gravity of the height variable mechanism 34 together. In the preferred embodiment, the height variable mechanism 34 is configured to movably press on the second connecting portion 3224 inside the operating member 32 from above downwards, so that the edge portion 3222 of the operating member 32 rotatably presses on the mounting hole 13 from above downwards.

Referring to FIG. 5 and FIG. 6, the operating member 32 includes a first part that is arranged on one side (upper side) of the support body and rotatably presses on the mounting hole 13, and the first part is typically configured as an operating knob 322. The operating member 32 further includes a second part that can pass through the mounting hole 13 to be arranged on the other side (the lower side) of the support body, the second part is typically configured as a knob shaft portion 324 that is coaxial and detachably connected with the operating knob 322, and when operably rotating relative to the support body, the operating knob 322 drives the knob shaft portion 324 to rotate synchronously. In other embodiments, the operating knob 322 and the knob shaft portion 324 are integrally formed or non-detachably connected.

The operating knob 322 is provided with the edge portion 3222 and the second connecting portion 3224 aforementioned, and the edge portion 3222 of the operating knob 322 presses on the mounting hole 13. The top end of the operating knob 322 passes through the upper chassis cover along the thickness direction of the upper chassis cover to be exposed above the upper chassis cover, and the operator operates the operating knob 322 by the top end extending out of the upper chassis cover. The second connecting portion 3224 passes through the center of the mounting hole 13 to and thus passes through the support body and reach the lower side of the support body, and the knob shaft portion 324 is coaxial and detachably connected with the second connecting portion 3224. In order to improve the coaxiality between the operating knob 322 and the mounting hole 13, a convex ring 14 is configured on the periphery of the mounting hole 13, and the operating knob 322 cooperates with the convex ring 14 along the radial direction.

As the best solution of this embodiment, the operating knob 322 is an integrally formed structure. The top of the edge portion 3222 is closed, an operating handle portion 3226 protruding upward from the top face of the edge portion is formed on the outer side of the top of the edge portion, and the operating handle portion 3226 extends out of the upper chassis cover to be exposed, so that the operator can twist the operating knob 322.

Referring to FIG. 5 and FIG. 6, the lower area of the outer periphery of the edge portion 3222 is configured with an anti-drop portion 3230 and a plurality of limiting slots 3228 that are evenly distributed in the bottom area of the outer periphery of the edge portion, wherein the anti-drop portion 3230 extends a certain length outwards along the radial direction of the edge portion 3222. The second connecting portion 3224 is configured with a connecting slot 3224a and a screw column hole 3224b.

The bottom area of the outer periphery of the edge portion 3222 is configured with a convex ring protruding outwards along the radial direction, the limiting slots 3228 are configured on the outer periphery of the convex ring, and the plurality of limiting slots 3228 are sequentially configured at intervals along the circumferential direction of the convex ring, wherein a single limiting slot 3228 is composed of two adjacent limiting strips that are spaced apart in parallel, and each of the two limiting strips extends a certain length along the axial direction of the operating knob 322.

The second connecting portion 3224 is configured inside the edge portion 3222 and is coaxial with the edge portion 3222. The second connecting portion 3224 is configured as an annular body, the annular body includes a pair of opposed flat plates and a pair of opposed arc-shaped plates, and the two flat plates and the two arc-shaped plates are alternately and hermetically connected along the circumferential direction, wherein the two arc-shaped plates take the center of the operating knob 322 as the axis.

The outer side faces of the two plates are respectively configured with screw column holes 3224b, the two screw column holes 2111b are symmetrically configured and both extend a certain length along the axial direction of the operating knob 322. The two arc-shaped plates are both configured with connecting slots 3224a penetrating through the thicknesses of the arc-shaped plates, the two connecting slots 3224a are symmetrically configured and both extend a certain length along the axial direction of the operating knob 322, and the two connecting slots 3224a respectively communicate with the bottom end faces of the two arc-shaped plates.

The knob shaft portion 324 is an integrally formed structure. The knob shaft portion 324 is an annular body matching the second connecting portion 3224. Correspondingly, the annular body of the knob shaft portion 324 includes a pair of opposed flat plates and a pair of opposed arc-shaped plates, and the two flat plates and the two arc-shaped plates are alternately and hermetically connected along the circumferential direction, wherein the two arc-shaped plates take the center of the operating knob 322 as the axis.

The lower area of the outer periphery of the knob shaft portion 324 is configured with a height adjustment protrusion portion 3242, and a connecting protrusion 3244 and a screw hole 3246, which are located on the top of the height adjustment protrusion portion, wherein the cooperation between the height adjustment protrusion portion 3242 and a carrying surface 3422a will be described below. The screw hole 3246 corresponds to the screw column hole 3224b for connecting a screw, and a connecting protrusion portion 3248 correspondingly cooperates with the connecting slots 3224a to transmit rotational torque.

The connecting protrusion portion 3248 is connected between the top ends of the two arc-shaped plates, and the connecting protrusion portion 3248 is installed in the two connecting slots 3224a. Screw holes 3246 are respectively configured on the outer side faces of the two flat plates, the two screw holes 3246 are respectively located on both sides of the connecting protrusion portion 3248 and their axes are parallel to the axis of the operating knob 322. The height adjustment protrusion portion 3242 protrudes outwards along the radial direction from the outer periphery of one of the arc-shaped plates, and its bottom end is flush with the bottom end face of the annular body. In this embodiment, the top face and the two side faces of the height adjustment protrusion portion 3242 realize smooth transition.

Based on the preferred embodiment of the above-mentioned operating member, the height variable mechanism 34 is configured to movably press on the knob shaft portion 324 of the operating member 32 from above downwards, so that the operating knob 322 rotatably presses on the mounting hole 13 from above downwards.

One of the knob shaft portion 324 and the height variable mechanism 34 is configured with an annular height adjustment portion 3422, and the circumferential surface of the height adjustment portion 3422 is configured with a carrying surface 3422a extending along the circumferential direction and varying in height; and the other of the knob shaft portion 324 and the height variable mechanism 34 is configured with a height adjustment protrusion portion 3242 extending along the radial direction of the height adjustment portion 3422. One of the height adjustment protrusion portion 3242 and the carrying surface 3422a movably presses on the other from above downwards, and one of the height adjustment protrusion portion 3242 and the carrying surface 3422a is operably driven by the operating member 32 to move relative to the other.

Based on the preferred embodiment of the above-mentioned operating member, the height adjustment protrusion portion 3242 is configured on the knob shaft portion 324, and the height adjustment portion 3422 is configured on the height variable mechanism 34. The cooperation of the height adjustment protrusion portion 3242 and the carrying surface 3422a will be described below in detail in the section of the height variable mechanism 34.

The height variable mechanism 34 includes a height adjustment mechanism 342 and a height-to-be-adjusted mechanism 344 connected with the height adjustment mechanism 342. The operating member 32 is movably connected with the height adjustment mechanism 342 and can operably drive the height adjustment mechanism 342 to drive the height-to-be-adjusted mechanism 344 to generate displacement along the height adjustment direction, wherein the height adjustment mechanism 342 and the height-to-be-adjusted mechanism 344 can be fixedly connected or movably connected, detachably connected or non-detachably connected.

Figure 4:
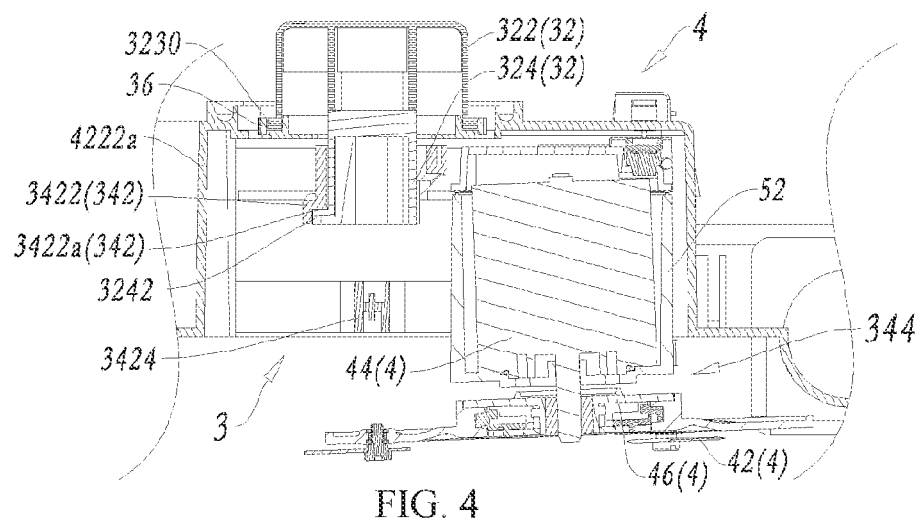
FIG. 4 is an X1-X1 sectional view of FIG. 3.

Referring to FIG. 4 and FIG. 5, in the autonomous working apparatus M provided in this embodiment, the height-to-be-adjusted mechanism 344 includes a working component 4 and a carrying mechanism 5, wherein the working component 4 includes a cutting plate assembly 42, a connecting structure 46 and a cutting motor 44. The cutting plate assembly 42 is detachably clamped on the connecting structure 46, and the connecting structure 46 is installed on the output shaft of the cutting motor 44 by interference fit. The carrying mechanism 5 is configured with a motor accommodating cavity 3444a with a bottom shaft hole, the motor accommodating cavity 3444a accommodates the cutting motor 44, and the output shaft of the cutting motor 44 extends out of the bottom shaft hole of the accommodating cavity and extends downwards.

The height adjustment mechanism 342 is approximately located in the front half cavity of a mounting space 12 formed by stretching the support body, and the carrying mechanism 5 and the working component 4 are approximately located in the rear half cavity of the mounting space 12 formed by the stretching the support body. The height adjustment mechanism 342 is configured to be operated by the user via the operating member 32, so that the ground clearance of the working component 4 is changed, and the working component 4 is maintained at a specific ground clearance.

One of the above-mentioned knob shaft portion 324 and the height adjustment mechanism 342 is configured with an annular height adjustment portion 3422, and the circumferential surface of the height adjustment portion 3422 is configured with a carrying surface 3422a extending along the circumferential direction and varying in height, and the circumferential surface includes an inner circumferential surface and an outer circumferential surface; the other of the above-mentioned knob shaft portion 324 and the height adjustment mechanism 342 is configured with a height adjustment protrusion portion 3242 extending along the radial direction of the height adjustment portion 3422, and the radial extension includes radially outward extension and radially inward extension. In the preferred embodiment, the height adjustment protrusion portion 3242 is configured on the knob shaft portion 324, and the height adjustment portion 3422 is configured on the height adjustment mechanism 342.

Figure 15:
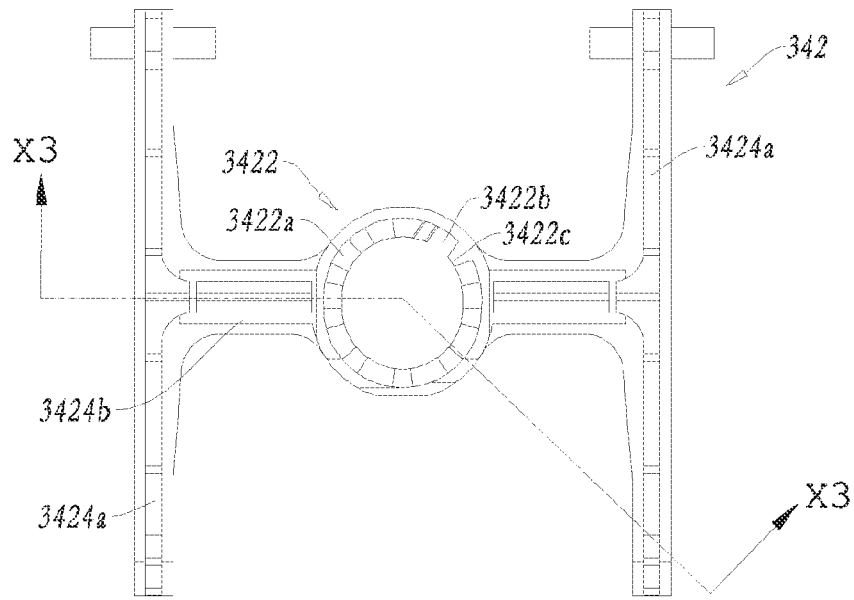
FIG. 15 is a coaxial elevation view of the height adjustment mechanism shown in FIG. 5.
Figure 16:
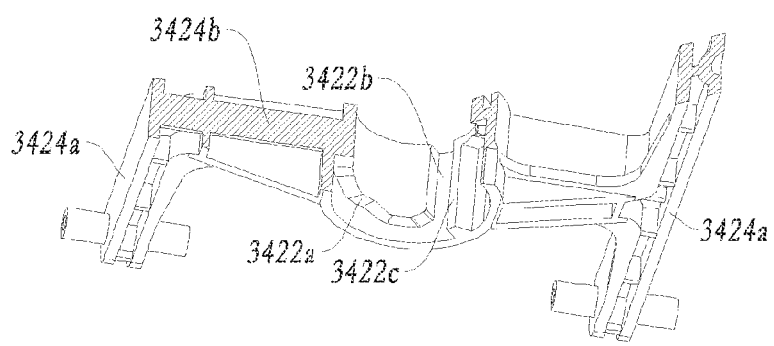
FIG. 16 is an X3-X3 sectional view of FIG. 15.
Figure 17:
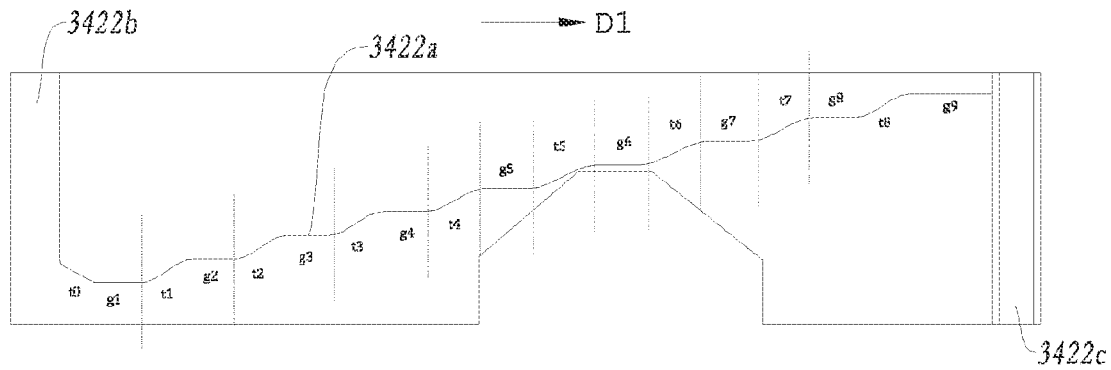
FIG. 17 is an expanded view of the inner circumference of the height adjustment portion according to an embodiment of the present invention.

Referring to FIG. 5, FIG. 15 and FIG. 16, as the most preferred solution of this embodiment, the height adjustment portion 3422 is an annular structure configured at the central position of a following auxiliary rod 3424b of the height adjustment mechanism 342, and the annular structure takes the center of the auxiliary rod 3424b as the axis and has an inner circumferential surface. FIG. 17 shows an expanded view of the inner circumferential surface of the annular structure.

The height adjustment portion 3422 includes a groove portion 3422b and an end wall 3422c, which are configured on the inner circumferential surface and are adjacent to each other, and the groove portion 3422b and the end wall 3422c both extend along the axial direction of the height adjustment portion 3422 and extend from the upper surface of the height adjustment portion 3422 to the lower surface. The height adjustment portion 3422 further includes a carrying surface 3422a facing downwards and varying in height, and the height of the carrying surface 3422a increases as a whole along the direction from the groove portion 3422b to the end wall 3422c (the D1 direction shown in FIG. 17).

In this embodiment, the annular structure has a certain thickness to facilitate the formation of the aforementioned carrying surface 3422a, the groove portion 3422b and the end wall 3422c on the inner circumferential surface of the annular structure, wherein the groove portion 3422b is formed by the inner circumferential surface of the annular structure by recessing outwards along the radial direction of the annular structure, and the groove portion 3422b is provided with a groove bottom surface and two groove side faces configured oppositely along the width direction of the groove bottom surface. The both width sides of the end wall 3422c sink outwards along the radial direction from the inner circumferential surface of the annular structure, and then the end wall 3422c is configured with a wall top face and two wall side faces configured oppositely along the width direction of the wall top face.

A groove side face of the groove portion 3422b is a wall side face of the end wall 3422c, and the width size of the groove portion 3422b is approximately the same as the width size of the end wall 3422c. The groove portion 3422b and the end wall 3422c are adjacent to each other with the same side face, so that the circumferential size occupied by the groove portion 3422b and the end wall 3422c on the inner circumferential surface is minimized, accordingly, the extension length of the carrying surface 3422a is maximized, and it is conducive to configuring multiple height adjustment level sections.

It should be understood that the groove portion 3422b and the end wall 3422c can be adjacent to each other in other manners, for example, there is no need to share a side face therebetween. There may be a size difference between the width sizes of the groove portion 3422b and the end wall 3422c, for example, the width size of the end wall 3422c is greater than the width size of the groove portion 3422b.

In this embodiment, the length of the carrying surface 3422a extends along the circumferential direction of the annular structure, and the width of the carrying surface 3422a extends substantially along the radial direction of the annular structure. Along the direction from the groove portion 3422b to the end wall 3422c (the direction D1 shown in FIG. 17), the carrying surface 3422a gradually extends from an area close to the lower surface of the height adjustment portion 3422 to an area close to the upper surface of the height adjustment portion 3422.

Specifically, the carrying surface 3422a starts from the other groove side face (the groove side face away from the end wall 3422c) formed by the groove portion 3422b and is connected with the groove side face, and the groove side face is interrupted at this position to prevent it from continuing to extend along the length direction of the groove portion 3422b. It should be understood that the starting end of the carrying surface 3422a is connected with the lower area of the other groove side face. In other words, the lower area of the other groove side face is the area close to the lower surface of the height adjustment portion 3422. The length of the carrying surface 3422a extends to the other wall side face (the wall side face away from the groove portion 3422b) formed by the end wall 3422c for termination and is connected with the wall side face to form a closed corner. It should be understood that the termination end of the carrying surface 3422a is connected with the upper area of the other wall side face. In other words, the upper area of the other wall side face is the area close to the upper surface of the height adjustment portion 3422.

In this embodiment, the two ends of the carrying surface 3422a in the length direction are respectively the starting end and the termination end, and the two ends of the carrying surface 3422a in the width direction are respectively a radially inward end and a radially outward end, wherein the inner circumferential surface between the radially inward end of the carrying surface 3422a and the upper surface of the height adjustment portion 3422 is flush with the wall top face of the aforementioned end wall 3422c, and the inner circumferential surface between the radially outward end of the carrying surface 3422a and the lower surface of the height adjustment portion 3422 is flush with the groove bottom surface of the aforementioned groove portion 3422b.

It should be understood that the upper side face of a bearing channel formed on the inner circumferential surface can serve as the carrying surface 3422a. For example, a channel recessing radially outwards from the inner circumferential surface is formed on the inner circumferential surface of the height adjustment portion 3422, and the extension form of the channel is the same as that of the above-mentioned carrying surface. The bearing channel is configured with a bearing channel bottom surface and two side faces configured oppositely along the width direction of the bearing channel bottom surface, which are respectively an upper side face and a lower side face.

The upper side face starts from the other groove side face (the groove side face away from the end wall 3422c) formed by the groove portion 3422b and is connected with the groove side face, and the groove side face is interrupted at this position to prevent it from continuing to extend along the length direction of the groove portion 3422b. The lower side face starts from one groove side face (the side face shared with the end wall 3422c) formed by the groove portion 3422b and is connected with the groove side face. An opening communicating the groove portion 3422b with the bearing channel is formed between the starting end of the upper side face and the starting end of the lower side face. The upper side face and the lower side face both extend to the other wall side face (the wall side face away from the groove portion 3422b) formed by the end wall 3422c for termination and is connected with the wall side face to form a closed corner.

In the above alternative embodiment, the bearing channel bottom surface is flush with the groove bottom surface of the groove portion 3422b, the inner circumferential surface between the upper side face and the upper surface of the height adjustment portion 3422 is flush with the wall top face of the end wall 3422c, and the inner circumferential surface between the lower side face and the lower surface of the height adjustment portion 3422 is flush with the wall top face of the end wall 3422c.

Referring to FIGS. 15-17, along the direction D1 in FIG. 17, the carrying surface 3422a includes at least one tilt section and at least two level sections. Preferably, the carrying surface includes a plurality of level sections (g1, g2, g3, . . . ) that are substantially parallel to the horizontal plane and have gradually increasing ground clearances, and tilt sections (t1, t2, t3, . . . ) that smoothly connect two adjacent level sections, and the height difference H between the first level section g1 and the last level section g9 is the height adjustment range of the cutting plate assembly 42.

The ground clearances are understood as the respective distances between the plurality of level sections (g1, g2, g3, . . . ) and the lower surface of the height adjustment portion 3422. Along the direction D1 in FIG. 17, the distances between the plurality of level sections (g1, g2, g3, . . . ) and the lower surface of the height adjustment portion 3422 gradually increase. In other words, the distances between the plurality of level sections (g1, g2, g3, . . . ) and the upper surface of the height adjustment portion 3422 gradually decrease.

In this embodiment, in order to ensure that the cutting plate assembly 42 enters a height adjustment process smoothly from the groove portion 3422b, there is a starting section t0 in front of the first level section g1, and the ground clearance of the starting section t0 along the direction D1 gradually decreases. Furthermore, the starting section t0 serves as a communication channel between the carrying surface 3422a and the groove portion 3422b, so that the height adjustment portion 3422 can be guided to smoothly enter the groove portion 3422b.

Referring to FIG. 4, when the working component 4 is assembled with the support body, the height adjustment portion 3422 is sleeved on the outer side of the knob shaft portion 324, and the top face of the height adjustment protrusion portion 3242 matches the carrying surface 3422a. Due to the action of gravity, the carrying surface 3422a presses on the top face of the height adjustment protrusion portion 3242, that is, the weight of the working component 4 and the carrying mechanism 5 is mainly transferred by the carrying surface 3422a to the height adjustment protrusion portion 3242, and then is transferred by the operating knob 322 to the support body (in addition, a hinge shaft also bears a part of the weight).

Figure 18:
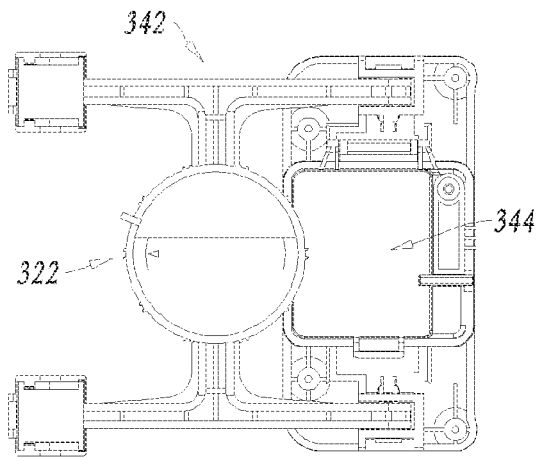
FIG. 18 is a schematic view of a working mechanism according to an embodiment of the present invention with the cutting plate in the highest position, wherein only the carrying mechanism and the height adjustment mechanism are shown.
Figure 19:
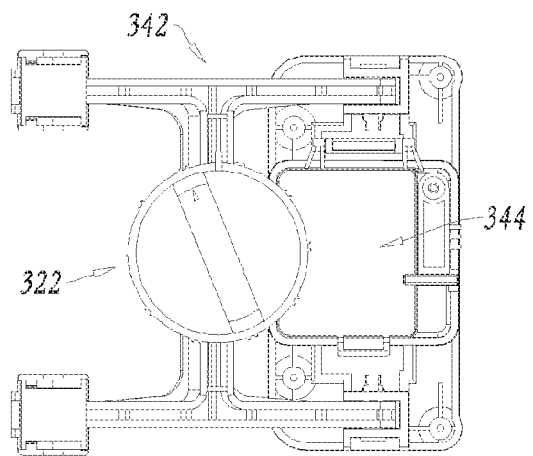
FIG. 19 is an elevation view of FIG. 18.
Figure 20:
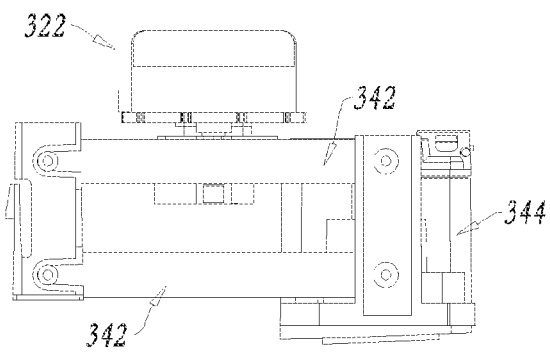
FIG. 20 is a schematic view of the working mechanism according to an embodiment of the present invention with the cutting plate in the lowest position, wherein only the carrying mechanism and the height adjustment mechanism are shown.
Figure 21:
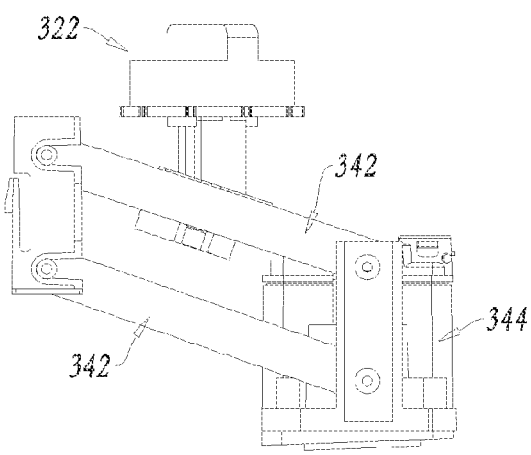
FIG. 21 is an elevation view of FIG. 20.

FIGS. 18 to 19 show that the position of the cutting plate assembly 42 is in the highest state, and the first level section g1 of the carrying surface 3422a presses on the top face of the height adjustment protrusion portion 3242. At this time, in order to reduce the height of the cutting plate assembly 42, the operating knob 322 can be rotated along the clockwise direction in FIG. 18 to make the same exemplarily reach the lowest position state of the cutting plate assembly 42 in FIGS. 20 to 21, at this time, the last level section g9 of the carrying surface 3422a presses on the top face of the height adjustment protrusion portion 3242, and due to the action of the end wall 3422c, the operating knob 322 cannot continue to rotate clockwise.

In this embodiment, the carrying surface 3422a communicates with the groove portion 3422b and is configured to extend from the groove portion 3422b toward the end wall 3422c, and the height adjustment protrusion portion 3242 can enter the carrying surface 3422a from the groove portion 3422b and then movably crimp with the carrying surface 3422a or exit the carrying surface 3422a, so as to depart from the height adjustment portion 3422. When the height variable mechanism 34 and the operating member 32 are assembled, the operating member 32 is rotated, so that the height adjustment protrusion portion 3242 enters the carrying surface 3422a from the groove portion 3422b. When the height variable mechanism 34 and the operating member 32 are disassembled, the operating member 32 is rotated, so that the height adjustment protrusion portion 3242 enters the groove portion 3422b from the carrying surface 3422a, and departs from the height adjustment portion 3422 from the groove portion 3422b.

In other embodiments, the configuration of the groove portion 3422b and the wall portion 2212c can be eliminated, a spacing structure is configured between the starting end and the termination end of the carrying surface 3422a, the spacing structure can be configured as a gap or can be configured to space apart the starting end and the termination end for a certain distance along the circumferential direction of the height adjustment portion 3422 via a certain structure. A stop block is configured to be arranged on the circumferential surface of the support body and/or the height adjustment portion 3422, the operating member 32 is prevented from entering the spacing structure from the start end or the termination end via the stop block, in other words, the operating member 32 is prevented from crossing the spacing structure from one of the start end and the termination end to reach the other by the stop block, resulting in an abrupt change in the height of the height variable mechanism 34.

In one embodiment, the stop block is configured on the support body in any manner, and along the height adjustment direction, the stop block corresponds to the aforementioned spacing structure, further, the stop block is located on the rotation path of the operating knob 322 in the operating member 32, the stop block is configured to be able to prevent the operating knob 322 from continuing to rotate along the original direction when reaching the extreme position, thereby preventing the height adjustment protrusion portion 3242 from crossing one of the starting end and the termination end of the carrying surface to reach the other.

In one embodiment, the stop block is configured in the aforementioned spacing structure, the stop block is located on the rotation path of the height adjustment protrusion portion 3242 of the knob shaft portion 324 in the operating member 32, and the stop block is configured to be able to prevent the height adjustment protrusion portion 3242 from continuing to rotate along the original direction when reaching the extreme position.

In this other embodiment, the knob shaft portion 324 of the operating member 32 adopts a design form that can pass through the height adjustment portion 3422 from bottom to top. During the assembly, the knob shaft portion 324 passes through the height adjustment portion 3422 from bottom to top, so that the height adjustment protrusion portion 3242 touches and supports the carrying surface 3422a. During disassembly, the knob shaft portion 324 departs from the height adjustment portion 3422 from above downwards, so that the height adjustment protrusion portion 3242 departs from the carrying surface 3422a.

Figure 7:
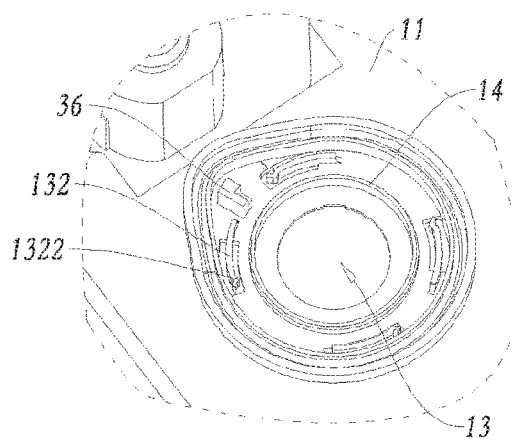
FIG. 7 is a partially enlarged view of the support body shown in FIG. 5 near the mounting holes, in a slightly different view from FIG. 5 for clarity and showing the stop block installed in the stop block hole.
Figure 8:
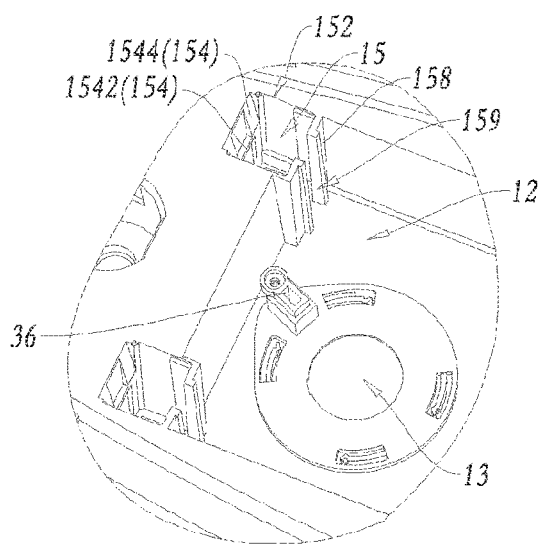
FIG. 8 is a partially enlarged view of the vicinity of the cavity of the support body shown in FIG. 5 after reversal, with a slightly different view than in FIG. 5 for clarity and showing the stop block installed in the stop block hole.

Referring to FIG. 5 and FIGS. 7 to 8, in order to prevent the situation that when the position of the cutting plate assembly 42 is in the highest state, the operating knob 322 is rotated counterclockwise to depart from the carrying surface 3422a and reach the groove portion 3422b, such that the height variable mechanism 34 departs from the operating member 32, an anti-drop structure is additionally configured. The anti-drop structure is configured to prevent the operating member 32 from rotating counterclockwise when the position of the cutting plate assembly 42 is in the highest state.

The anti-drop structure includes a stop block 36 that is detachably assembled on the support body and the aforementioned anti-drop portion 3230 configured on the operating knob 322, and the stop block 36 corresponds to the groove portion 3422b along the height adjustment direction and is located on the rotation path of the anti-drop portion 3230.

When the stop block 36 is assembled on the support body, the anti-drop portion 3230 abuts against the stop block 36 along the counterclockwise rotation direction. At this time, the height adjustment protrusion portion 3242 approximately presses with the lowest point of the carrying surface 3422a to prevent the height adjustment protrusion portion 3242 from continuing to move along the carrying surface 3422a to depart from the carrying surface 3422a and enter the groove portion 3422b.

After the stop block 36 is disassembled from the support body, the anti-drop portion 3230 can continue to rotate along the counterclockwise rotation direction. At this time, the height adjustment protrusion portion 3242 can continue to move along the carrying surface 3422a to depart from the carrying surface 3422a and enter the groove portion 3422b, so that the height adjustment mechanism 342 is disassembled from the operating member 32.

In this embodiment, the support body is configured with a stop block hole 16 penetrating through the thickness of the support body, and the stop block 36 includes a base portion 362 and a stop portion 364 configured on the base portion 362, wherein the stop portion 364 is configured to be able to pass through the stop block hole 16 and reach the upper side of the stop block hole 16, further, the stop portion is located on the rotation path of the anti-drop portion 3230, and the base portion 362 abuts against the lower edge of the stop block hole 16.

The stop block hole 16 is preferably a square hole. The stop portion 364 is an L-shaped structure, and the stop portion 364 passes through the stop block hole 16 from the lower side of the support body and reaches the upper side of the support body, and its L-shaped opening forms a stop for the counterclockwise rotation of the anti-drop portion 3230, wherein the base portion 362 is installed in the stop block hole 16 and the lower end of which extends to the lower side of the support body, and one side of the base portion 362 is configured with a screw fastening hole. The position of the base portion 362 is defined by the stop block hole 16, and the base portion 362 is fastened by a screw passing through the screw fastening hole. Since the upper chassis cover is installed above the support body, the anti-drop portion 3230 and the stop portion 364 cannot be touched when the upper chassis cover is not disassembled.

Referring to FIGS. 11 to 14, in another embodiment, the support body is configured with a stop block hole 16 penetrating through the thickness of the support body, and the lower edge of the stop block hole 16 is configured with two groove portions 162 that are opposite to each other along the radial direction of the stop block 36 and are spaced part from each other. In this embodiment, the groove portion 162 is configured to be semicircular.

The groove portion 162 includes a groove portion base 1622 and an edge portion 1624 formed by a peripheral protrusion of the groove portion base 1622, and the groove portion base 1622 and the edge portion 1624 are both coaxial with the stop block hole 16, wherein the groove portion base 1622 and the edge portion 1624 are preferably configured to be semicircular. The base surface of the groove portion base 1622 extends a certain length along the radial direction of the stop block hole 16, and preferably partially covers the stop block hole 16. The axial position of the groove portion base 1622 is configured with a penetration portion 1623 recessing inwards on the surface of the groove portion base, the two penetration portions 1623 of the two groove portion bases 1622 of the two groove portions 162 are opposite to each other, and constitute an interval that allows the stop portion 364 of the stop block 36 to pass through from bottom to top.

The edge portion 1624 extends a certain height along the axial direction of the stop block hole 16. The inner circumferential surface of the edge portion 1624 is configured with a rotation limiting groove 1624a extending radially outwards, and the two rotation limiting grooves 1624a of the two edge portions 1624 are located on the same circumference for matching and limiting a rotation limiting protrusion 3624 of the stop block 36. The circumferential surfaces on the both circumferential sides of the rotation limiting groove 1624a constitute a rotation matching surface 1624b, four spaced-apart rotation matching surfaces 1624b are constituted on the inner circumferences of the two edge portions 1624, and the four rotation matching surfaces 1624b are located on the same circumference for matching a rotation body 3622 of the stop block 36. Preferably, the groove bottom surface of the rotation limiting groove 1624a and the rotation matching surface 1624b are both obliquely configured.

The lower edge of the stop block hole 16 is further configured with two hooks 164 opposite to each other along the radial direction of the stop block hole 16. The two hooks 164 extend downwards from the lower edge of the stop block hole 16, and the tail ends of the two hooks extend inwards along the radial direction of the stop block hole 16 to form two hook portions 1642. The two hooks 164 and two groove portions 162 are alternately spaced apart along the circumferential direction of the stop block hole 16, the two hook portions 1642 are spaced apart from the top ends of the two groove portions 162, and the base portion 362 of the stop block 36 can be set in the two hooks 164 and the two groove portions 162.

The stop block 36 includes a handle portion 366, a knob portion 368, a stop portion 364 and a base portion 362, wherein the handle portion 366 has a columnar structure and extends a certain length, so as not to exceed the outer contour of the height variable mechanism 34, and it is better convenient for the fingers of the user to touch the knob portion 368. The stop portion 364 is configured on a tail end of the handle portion 366, the knob portion 368 is configured on the other end of the handle portion 366, and the base portion 362 is configured on an area of the handle portion 366 adjacent to the stop portion 364.

The base portion 362 includes two rotation bodies 3622, two rotation limiting protrusions 3624 and two wing portions 3626, wherein the two rotation bodies 3622 are oppositely configured on the outer circumference of the handle portion 366 along the radial direction of the handle portion 366, the two rotation bodies 3622 have two outer circumferential surfaces located on the same circumference, and the two outer circumferential surfaces are used for matching the aforementioned four rotation matching surfaces 1624b.

The two rotation limiting protrusions 3624 are oppositely configured on the outer circumference of the handle portion 366 along the radial direction of the handle portion 366, the two rotation limiting protrusions 3624 have two outer circumferential surfaces located on the same circumference, the two rotation limiting protrusions 3624 are used for matching the aforementioned rotation limiting grooves 1624a, and the outer circumferential surfaces are used for matching the groove bottom surfaces of the rotation limiting grooves 1624a. The two rotation limiting protrusions 3624 and the two rotation bodies 3622 are located on the same circumference and are alternately spaced apart along the circumferential direction of the handle portion 366.

The two wing portions 3626 are oppositely configured on the outer circumference of the handle portion 366 along the radial direction of the handle portion 366 and extend a certain length along the radial direction of the handle portion 366. Along the axial direction of the handle portion 366, the two rotation limiting protrusions 3624 and the two rotation bodies 3622 are all located between the two wing portions 3626 and the aforementioned stop portion 364.

The circumferential size of the rotation limiting protrusion 3624 is much smaller than the circumferential size of the rotation limiting groove 1624a. During the assembly, the stop block 36 is operated via the knob portion 368, so that the stop block 36 is inserted into the stop block hole 16 from bottom to top, and the rotation limiting protrusion 3624 is located at one end of the rotation limiting groove 1624a in the circumferential direction, and at this time, the two wing portions 3626 and the two hooks 164 are in a non-connected state. The knob portion 368 is rotated, so that after the rotation limiting protrusion 3624 rotates a certain angle along the circumferential direction of the rotation limiting groove 1624a toward the other end, one rotation body 3622 matches the two rotation matching surfaces 1624b of the two groove portions 162 at the same time, the two wing portions 3626 enter the upper side of the two hook portions 1642 of the two hooks 164 in a one-to-one correspondence manner, and the two hook portions 1642 support the entire stop block 36 on the groove portion 162 along a direction opposite to the gravity.

The stop portion 364 is configured to be able to pass through an interval formed by the two penetration portions 1623 of the two groove portions 162, and then pass through the stop block hole 16 to reach the upper side of the stop block hole 16, and the stop portion is located on the rotation path of the anti-drop portion 3230. Since the upper chassis cover will be installed above the support body, the anti-drop portion 3230 and the stop portion 364 cannot be touched when the upper chassis cover is not disassembled.

In this embodiment, preferably, the operating member 32 is an integrally formed structure, and if the stop block 36 provided in the other embodiment described above is used, the adjustable mechanism 3 is entirely installed on the support body without using screws and/or bolts. Since there is no need to use screws and/or bolts, assembly is achieved without using threaded fasteners at all.

Referring to FIG. 5 and FIGS. 7-8, in order to maintain the stability of the stop block 36, a plurality of limiting elastic members 132 are arranged on the outer circumference of the mounting hole 13, and the limiting elastic member 132 cooperates with the limiting slot 3228 of the aforementioned operating knob 322, so that the level section of the carrying surface 3422a relatively stably presses on the top face of the height adjustment protrusion portion 3242.

Specifically, a single limiting elastic member 132 extends a certain length along the circumferential direction of the mounting hole 13. At one end close to the length direction of the limiting elastic member 132, the inner surface of the limiting elastic member 132 is configured with a limiting protrusion 1322 extending radially inwards from the inner surface, the length of the limiting protrusion 1322 extends from the top end face of the limiting elastic member 132 to the bottom end face, and limiting is realized by the cooperation of the limiting protrusion 1322 and the limiting slot 3228. The entirety starts from the limiting protrusion 1322 and extends to the area at the other end of the limiting elastic member 132 in the length direction to ensure good elasticity.

Preferably, the limiting elastic member 132 is integrally formed on the support body.

Since the height adjustment protrusion portion 3242 located below the carrying surface 3422a restricts the downward movement of the working component 4, and the upward movement of the working component is not restricted to a certain extent in a non-highest position state, so during the actual work of an intelligent outdoor robot, if it encounters hard objects such as a rock protruding from the ground, the working component 4 can be lifted up under the action of the protruding hard objects, thereby avoiding the damage to the working component 4 caused by direct collision.

In this embodiment, the height variable mechanism 34 is movably connected to the support body, the movable connection allows the height variable mechanism 34 to generate displacement along the height adjustment direction and prevents the height variable mechanism 34 from rotating together with the operating member 32, and the movable connection provides no supporting function for the height variable mechanism 34 in the height adjustment direction. In this way, when the operating member 32 rotates relative to the support body, the height variable mechanism 34 is driven to move relative to the support body, and this movement causes the height variable mechanism 34 to generate displacement along the height adjustment direction.

The height variable mechanism 34 and the support body are connected by a connecting member 3424. Driven by the operating member 32, the height variable mechanism 34 can move relative to the support body, wherein the first end of the connecting member 3424 can be hinged, slidably connected or fixedly connected with the support body, and the second end of the connecting member 3424 can be hinged, slidably connected or fixedly connected with the support body. The connection modes of the first end and the second end of the connecting member 3424 can be the same or different, and the cooperation is selected as long as the height variable mechanism 34 is allowed to generate displacement along the height adjustment direction and the height variable mechanism 34 is prevented from rotating together with the operating member 32.

For example, the first end of the connecting member 3424 is hinged with a supporting component via a hinge shaft, and the second end of the connecting member 3424 is hinged with the height variable mechanism 34 via a hinge shaft. For example, the first end of the connecting member 3424 is slidably connected with the supporting component, the sliding connection can allow the connecting member 3424 to move relative to the support body along the height adjustment direction, and the second end of the connecting member 3424 and the height variable mechanism 34 are fixedly connected or are hinged by a hinge shaft. For example, the first end of the connecting member 3424 and the supporting component are fixedly connected or are hinged by a hinge shaft, the second end of the connecting member 3424 is slidably connected with the height variable mechanism 34, and the sliding connection can allow the connecting member 3424 to move relative to the height variable mechanism 34 along the height adjustment direction.

At least one of the height adjustment mechanism 342 and the height-to-be-adjusted mechanism 344 is movably connected with the support body, so as to allow the height variable mechanism 34 to move along the height adjustment direction and prevent the height variable mechanism 34 from rotating together with the operating member 32. In this way, the operating member 32 is movably connected with the height adjustment mechanism 342 and can operably drive the height adjustment mechanism 342 to drive the height-to-be-adjusted mechanism 344 to generate displacement along the height adjustment direction.

For example, the height adjustment mechanism 342 and the height-to-be-adjusted mechanism 344 are movably connected or fixedly connected, and the height adjustment mechanism 342 is movably connected with the support body. For example, the height adjustment mechanism 342 and the height-to-be-adjusted mechanism 344 are movably connected or fixedly connected, and the height-to-be-adjusted mechanism 344 is movably connected with the support body. For example, the height adjustment mechanism 342 and the height-to-be-adjusted mechanism 344 are movably connected with the support body at the same time via a connecting member 3424. For example, the height adjustment mechanism 342 and the height-to-be-adjusted mechanism 344 are movably connected with the support body via two identical connecting members 3424, respectively.

In the preferred embodiment, the height adjustment mechanism 342 includes a connecting member 3424 movably connected with the support body and a height adjustment portion 3422 configured on the connecting member 3424, and the height adjustment portion 3422 is movably connected with the support body indirectly in a manner of being configured on the connecting member 3424. Preferably, the height adjustment portion 3422 is configured on the connecting member 3424 away from the first end. Further preferably, the height adjustment portion 3422 is configured on the connecting member 3424 between the first end and the second end.

The height-to-be-adjusted mechanism 344 is optionally connected with at least one of the connecting member 3424 and the height adjustment portion 3422 of the height adjustment mechanism 342, so that the height-to-be-adjusted mechanism 344 is connected with the height adjustment mechanism 342, and is movably connected with the support body directly or indirectly at the same time.

For example, the height-to-be-adjusted mechanism 344 and the height adjustment portion 3422 are fixedly connected or movably connected, non-detachably connected or detachably connected, for example, detachably hinged. For example, the height-to-be-adjusted mechanism 344 and the connecting member 3424 are fixedly connected or movably connected, non-detachably connected or detachably connected, for example, detachably hinged.

Preferably, the connecting member 3424 includes a first end and a second end, which are opposite to each other, the first end is detachably hinged with the support body, and the second end is detachably connected with the height-to-be-adjusted mechanism 344. In this way, driven by the operating member 32, the height-to-be-adjusted mechanism 344 rotates with the first end of the connecting member 3424 as the rotation center, and then generates displacement in the height adjustment direction.

It should be noted that the movement path of the height-to-be-adjusted mechanism 344 relative to the support body includes an arc path and a straight path. The straight path includes a path that coincides with the height adjustment direction and a path that intersects the height adjustment direction. The movement path of the height-to-be-adjusted mechanism 344 depends on the connection mode between the height variable mechanism 34 and the support body.

For example, the first end of the connecting member 3424 is slidably connected with the supporting component, and the second end of the connecting member 3424 is fixedly connected or slidably connected with the height adjustment mechanism 342/the height-to-be-adjusted mechanism 344. For example, the first end of the connecting member 3424 is fixedly connected or slidably connected with the supporting component, and the second end of the connecting member 3424 is slidably connected with the height adjustment mechanism 342/the height-to-be-adjusted mechanism 344. The sliding connection in the two embodiments allows the path of the height adjustment mechanism 342/the height-to-be-adjusted mechanism 344 to be the straight path that coincides with the height adjustment direction. The sliding connection in the two embodiments also allows the path of the height adjustment mechanism 342/the height-to-be-adjusted mechanism 344 to be the path that intersects the height adjustment direction.

The connecting member 131424 is a link mechanism. The connecting member 3424 is provided with at least one connecting rod 3424a, and the height adjustment portion 3422 is configured on the connecting rod 3424a. When the connecting member 3424 is provided with one connecting rod 3424a, the height adjustment portion 3422 is configured at the middle position of the connecting rod 3424a.

When the connecting member 3424 is provided with at least two connecting rods 3424a, the at least two connecting rods 3424a are sequentially configured at intervals. The first ends of the at least two connecting rods 3424a are all detachably hinged with the support body, and the second ends of the at least two connecting rods 3424a are all detachably hinged with the height-to-be-adjusted mechanism 344. When the number of the connecting rods 3424a is an odd number, the height adjustment portion 3422 is configured at the middle position of the middlemost connecting member 3424.

When the number of connecting rods 3424a is an even number, the height adjustment portion 3422 is configured between two adjacent middlemost connecting rods 3424a. Preferably, the connecting member 3424 is further provided with an auxiliary rod 3424b connected between two adjacent connecting rods 3424a, and the height adjustment portion 3422 is configured on the auxiliary rod 3424b.

It should be understood that the at least two connecting rods 3424a can all be spaced apart in parallel and partially spaced apart in parallel in sequence. Or, two adjacent connecting rods 3424a of the at least two connecting rods 3424a form an angle. For example, in order to improve the strength, the two adjacent connecting rods 3424a can intersect, or the two adjacent middlemost connecting rods 3424a can intersect, and the height adjustment portion 3422 is configured at the intersection position.

In this embodiment, the connecting member 3424 is configured as a structure similar to an I-beam, and can be a structure similar to a truss in other embodiments.

In this embodiment, preferably, the connecting member 3424 is provided with two connecting rods 3424a and one auxiliary rod 3424b.

Along the traveling direction of the working apparatus, the two connecting rods 3424a extend a certain length. Along the traveling direction vertical to the working apparatus, the two connecting rods 3424a are configured at intervals in parallel. The auxiliary rod 3424b extends a certain length along the traveling direction vertical to the working apparatus, and the auxiliary rod 3424b is connected between the middle parts of the two connecting rods 3424a.

The first end of the connecting rod 3424a732a is detachably hinged with the support body via a hinge shaft. Specifically, a mount seat 18 is detachably assembled on the support body located on the front side of the mounting space 12, and the first end of the connecting rod 3424a passes through the front side cavity wall of the mounting space 12 and is detachably hinged on the mounting space 12. The second end of the connecting rod 3424a is hinged with the carrying mechanism 5 via a pin hole and a pin.

The middle part of the auxiliary lever 3424b is configured with a height adjustment portion 3422, the height adjustment portion 3422 is configured to cooperate with the operating knob 322, this cooperation converts the rotational movement of the operating knob 322 into the rotational movement of the connecting member 3424 around the rotation center of the first end, thereby realizing the up and down movement of the carrying mechanism 5 and the working component 4.

In this embodiment, the height adjustment mechanism 342 includes two connecting members 3424, the other connecting member 3424 has the same structure as the above-mentioned connecting member 3424, and the other connecting member 3424 is configured below the above-mentioned connecting member 3424 at intervals. The difference between the two connecting members is that the lower connecting member 3424 at the lower side cancels the configuration of the height adjustment portion 3422. The connecting member 3424 at the lower side and the connecting member 3424 at the upper side are parallel and face each other in the vertical direction, and are configured to improve the strength of the height adjustment mechanism 342. In this embodiment, the lower surface of the height adjustment portion 3422 is connected with the auxiliary rod 3424b of the connecting member 3424 at the lower side.

In this embodiment, the mount seat 18 is detachably assembled on the support body located on the front side of the mounting space 12, and the first end of the connecting rod 3424a is detachably hinged with the support body via a hinge shaft.

Specifically, the support body is configured with a mounting portion, the mounting portion is configured with a cavity 15, and the cavity 15 is configured with an opening 152 that opens downwards. The mount seat 18 is provided with a body 182 and a fourth connecting portion 184 configured on the body 182, and the fourth connecting portion 184 corresponds to the mounting space 12 formed by stretching the support body, so as to facilitate the movable connection of the connecting rod 3424*a*. The mount seat 18 is configured to be able to be set into the cavity 15 via the opening 152 or depart from the cavity 15 via the opening 152.

A cavity groove portion 154 is configured on the cavity wall of the cavity 15, and a body groove portion 1822 is configured on the side wall of the body 182. One of the cavity groove portion 154 and the body groove portion 1822 is a convex structure, and the other of the cavity groove portion 154 and the body groove portion 1822 is a slot structure, and the slot structure is configured to be able to accept the convex structure.

Preferably, at least one side wall of the body 182 is configured with a convex structure, and at least one cavity wall of the cavity 15 is configured with a slot structure. The cavity groove portion 154 has a supporting surface 1542 facing upwards, the body groove portion 1822 has a to-be-supported surface 1822*a* facing downwards, when the body 182 is set into the cavity 15 from the opening 152 from bottom to top, the to-be-supported surface 1822*a* is supported on the supporting surface 1542, and then the body 182 is supported and set in the cavity 15, so that the body 182 will not depart from the cavity 15 due to gravity. Further preferably, the fourth connecting portion 184 and the body groove portion 1822 are respectively configured on two opposite side faces of the body 182.

Figure 9:
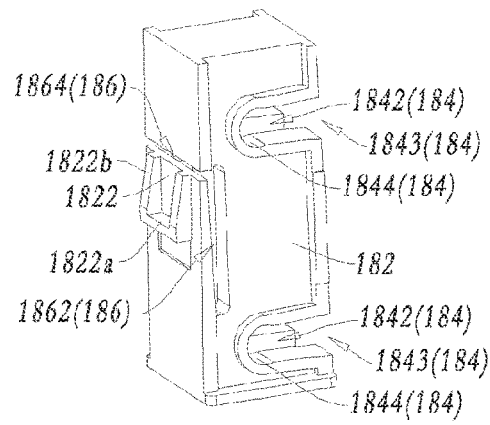
FIG. 9 is a schematic view of a mount seat according to an embodiment of the present invention.
Figure 10:
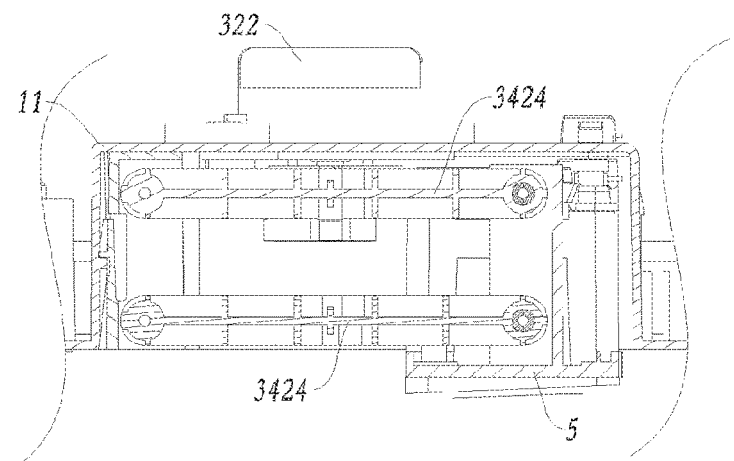
FIG. 10 is an X2-X2 sectional view of FIG. 3.
Figure 11:
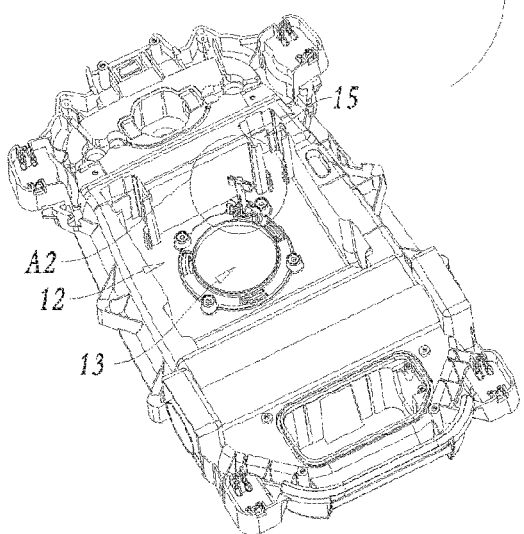
FIG. 11 is a schematic view of a working mechanism according to another embodiment of the present invention.
Figure 12:
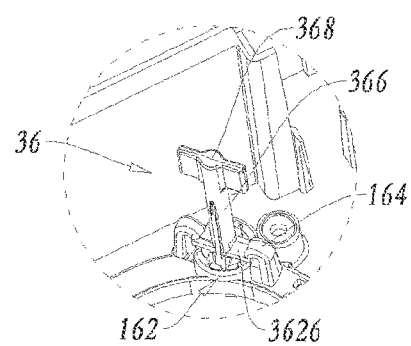
FIG. 12 is an enlarged view of part A1 of FIG. 11, wherein the stop block is in a locked position.
Figure 13:
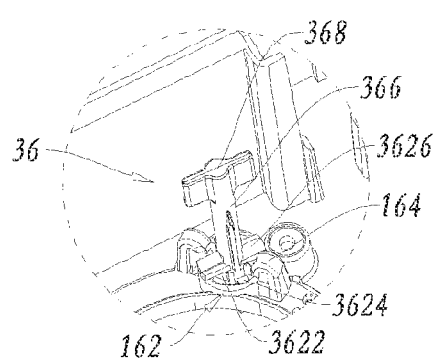
FIG. 13 is an enlarged view of part A1 of FIG. 11, wherein the stop block is in a released state.
Figure 14:
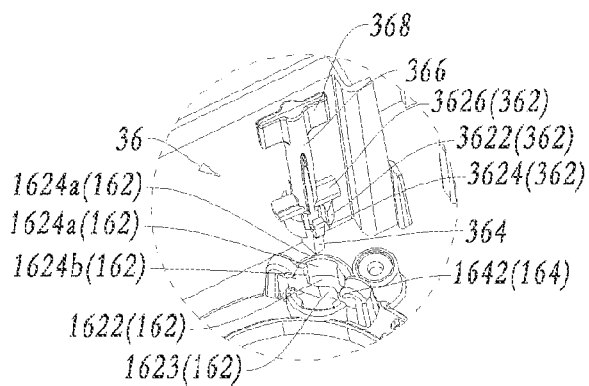
FIG. 14 is an enlarged view of part A1 of FIG. 11, wherein the stop block is in a disengaged state.

Referring to FIG. 9, further preferably, the body groove portion 1822 is substantially a U-shaped structure protruding from the side wall surface of the body 182. The to-be-supported surface 1822*a* is located on the outer side of the bottom wall of the U-shaped structure, and the side face of the U-shaped structure away from the side wall is a convex inclined surface 1822*b* that forms an included angle with the body. Specifically, along the direction from bottom to top, the convex inclined surface 1822*b* gradually approaches to the side wall surface of the body 182.

Referring to FIG. 8, correspondingly, the cavity groove portion 154 is substantially a U-shaped groove recessing from the cavity wall surface of the cavity 15. The bottom wall surface of the U-shaped groove is the supporting surface 1542, and the two side edges of the U-shaped groove in the width direction are obliquely configured to form a slot inclined surface 1544, and the configuration of the slot inclined surface 1544 matches that of the convex inclined surface 1822*b* of the aforementioned U-shaped structure.

In this embodiment, at least one of the cavity wall of the cavity 15 and the side wall of the body 182 is configured with an avoidance gap 186. The avoidance gap 186 is configured to be able to allow one of the cavity groove portion 154 and the body groove portion 1822 to elastically deflect toward a direction away from the other, so as to avoid and rebound toward the direction close to the other to be connected to the other.

Preferably, the avoidance gap 186 is configured on the body 182. The avoidance gap 186 is configured to be able to allow the body groove portion 1822 to elastically deflect toward the inside of the body 182, so as to avoid the cavity groove portion 154 of the cavity 15 and rebound toward the outside of the body 182 to be set in the cavity groove portion 154 of the cavity 15.

Specifically, the body 182 has a first side and a second side, which are opposite to each other, and a third side connected between the first side and the second side. The avoidance gap 186 includes a first avoidance gap 1861 and a second avoidance gap 1862, wherein the first avoidance gap 1861 passes from the first side to the second side and extends a certain length along the third side, the second avoidance gap 1862 extends from a tail end of the first avoidance gap 1861 to the third side, and the body groove portion 1822 is configured on the third side. The second avoidance gap 1862 extends from the top end of the first avoidance gap 1861 to the third side.

In this embodiment, a cavity wall close to the opening 152 is configured with an inclined mounting guide surface 156. When the mount seat 18 is installed via the opening 152, the operator aligns the cavity wall configured with the cavity groove portion 154 and the side wall configured with the body groove portion 1822, and under the guidance of the mounting guide surface 156, the mount seat 18 is forcefully pressed into the cavity 15. When the mount seat 18 primarily enters the cavity 15, the side wall and the cavity wall generate interference, after the operator uses an external force, due to the configuration of the avoidance gap 186, the body groove portion 1822 elastically deflects toward the inside of the body 182 to avoid the cavity groove portion 154. When the mount seat 18 reaches the bottom of the cavity 15, the body groove portion 1822 rebounds toward the outside of the body 182 and is connected to the cavity groove portion 154 of the cavity 15.

In this embodiment, the connecting member 3424 is detachably hinged on the mount seat 18.

Specifically, the fourth connecting portion 184 is configured with an avoidance channel 1842 extending along the height adjustment direction and two shaft hubs 1844 that are coaxially connected to the both sides of the avoidance channel 1842 in the width direction. Each of the two shaft hubs 1844 has an opening 1843 and is configured to be able to allow the hinge shaft to enter the two shaft hubs 1844 via the opening 1843. One of the cavity walls of the cavity 15 is shared with the mounting space 12 formed by stretching the support body, the cavity wall includes two half cavity walls 158 configured at intervals, the interval 155 communicates with the opening 152 and corresponds to the avoidance channel 1842, the two half cavity walls 158 close the two openings 1843 in the one-to-one correspondence manner to prevent the hinge shaft from departing from the openings 1843.

When the connecting member 3424 is specifically connected with the mount seat 18, the hinge shaft on the first end of the connecting member 3424 is installed in the shaft hub 1844 at first, so that the mount seat 18 and the connecting member 3424 move toward the cavity 15 synchronously, the connecting member 3424 enters the interval 155 formed by the two half cavity walls 158, and the mount seat 18 enters the cavity 15.

When the entire adjustable mechanism 3 needs to be disassembled from the support body, the following steps can be followed: S1, detaching the stop block 36; S2, rotating the operating knob 322 counterclockwise, so that the height adjustment protrusion portion 3242 enters the groove portion 3422*b* via the starting section t0, and then the height variable mechanism 34 and the operating member 32 can be disassembled; and S3, removing the connection between the mount seat 18 and the cavity 15, so that the mount seat 18 and the height variable mechanism 34 can be disassembled downwards. During installation, the above disassembly steps are executed reversely.

The mount seat 18 provided in this embodiment can be disassembled and assembled by using tools, and the connecting member 3424 can be disassembled and assembled from the mount seat 18 with bare hands. In other embodiments, the configuration of the mount seat 18 is eliminated, the connecting member 34241 can be hinged to the support body in a common hinge manner, and at this time, the connecting member 3424 can be disassembled and assembled with bare hands, so the entire adjustable mechanism 3 can be disassembled from the support body with bare hands or assembled on the support body with bare hands.

In other non-preferred embodiments, one of the operating member 32 and the support body is configured with an annular-shaped height adjustment portion 3422, and the circumferential surface of the height adjustment portion 3422 is configured with a carrying surface 3422a extending along the circumferential direction and varying in height. The other of the operating member 32 and the support body is configured with a height adjustment protrusion portion 3242 extending along the radial direction of the height adjustment portion 3422. One of the height adjustment protrusion portion 3242 and the carrying surface 3422a movably presses on the other from above downwards, and the operating member 32 is configured to be able to drive one of the height adjustment protrusion portion 3242 and the carrying surface 3422a to move relative to the other when operably rotating relative to the support body.

Specifically, the support body is configured with a mounting hole 13, and the edge of the mounting hole 13 is stretched downwards to form an annular-shaped height adjustment portion 3422, and the inner circumferential surface of the height adjustment portion 3422 is configured with an upward carrying surface 3422a. The center of the operating element 32 is configured with a second connecting portion 3224, the outer circumferential surface of the second connecting portion 3224 is configured with a height adjustment protrusion portion 3242, and the height adjustment protrusion portion 3242 presses on the carrying surface 3422a. The operating member 32 is operated, and the operating member 32 is driven to rotate relative to the support body, the height adjustment protrusion portion 3242 moves along the extension direction of the carrying surface 3422a, and then operating member 32 generates displacement relative to the support body along the height adjustment direction, thereby driving the height variable mechanism 34 connected thereto to generate displacement synchronously.

In other embodiments, the edge of the mounting hole 13 is stretched upward to form an annular-shaped height adjustment portion 3422, and the upward carrying surface 3422a is configured on the inner circumferential surface or the outer circumferential surface of the height adjustment portion 3422. Or, the edge of the mounting hole 13 is stretched upwards to form an annular-shaped structure, and the height adjustment protrusion portion 3242 extending along the radial direction is configured on the inner circumferential surface or the outer circumferential surface of the annular-shaped structure, and furthermore, the annular-shaped height adjustment portion 3422 is configured on the operating member 32.

The height variable mechanism 34 is movably connected with the support body, and the movable connection allows the height variable mechanism 34 to generate displacement along the height adjustment direction and prevents the height variable mechanism 34 from rotating along with the operating member 32. In this way, when the operating member 32 rotates relative to the support body, the height variable mechanism 34 is driven to move relative to the support body, and this movement causes the height variable mechanism 34 to generate displacement along the height adjustment direction.

In this embodiment, the height variable mechanism 34 is in rotatable socket connection with the operating member 32. Preferably, a convex disc is detachably connected to the lower end of the operating member 32, the height variable mechanism 34 is in socket connection with the lower end of the operating member 32, then the convex disc is connected to the lower end of the operating member 32, and the height variable mechanism 34 naturally presses on the convex disc by gravity. When the operating member 32 rotates relative to the support body and the height variable mechanism 34, the operating member 32 synchronously drives the height variable mechanism 34 to generate displacement along the height adjustment direction.

Related prior art discloses a quick connection type lawn mower blade, wherein a driving shaft extends from the proximal end of a base into a blade connector base, the blade connector base is a partially hollow cylinder, and bolts pass through the distal end of the base to connect the blade connector base to the driving shaft. The blade is kept close to the blade connector base, the blade is provided with a receiving hole and two alignment holes symmetrically arranged on the both sides of the receiving hole along the length direction of the blade, and the receiving hole is formed in the intersection position of the longitudinal center line and the transverse center line of the blade. The blade connector base id provided with a protrusion portion, the protrusion portion extends toward a direction away from its distal end, the receiving hole of the blade receives the protrusion portion of the base when the blade is aligned with the blade connector base, a retaining bolt passes through the receiving hole and enters the center of the distal end of the blade connector base, and the retaining bolt is clamped on the blade connector base to retain the blade in the vicinity of the blade connector base or make the blade touch the blade connector base. In the aforementioned quick connection type lawn mower blade, various components are connected in a screwing manner, the blade connector base is connected to the driving shaft by bolts, the blade is connected to the blade connector base by bolts, and the blade is driven by the driving shaft to rotate to perform cutting operations. Since the components are assembled by using bolts, the cumbersome assembly leads to wore assembly convenience and replacement efficiency, and the bolts may loose or fall off, resulting in certain hidden safety hazards in the use of the blade.

Figure 22:
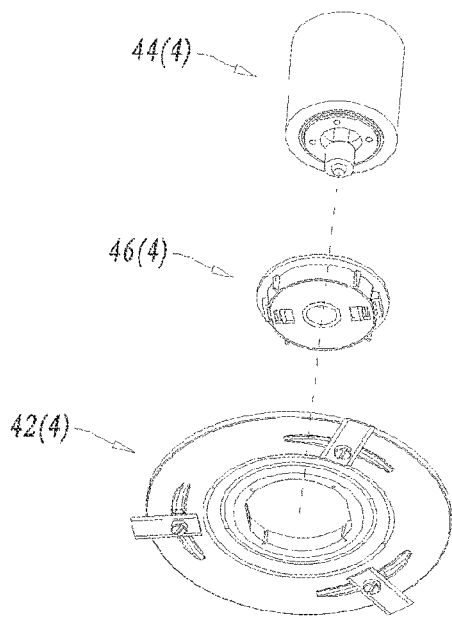
FIG. 22 is an exploded view of a working component according to an embodiment of the present invention.

Referring to FIG. 22, the working component 4 provided in this embodiment includes a connecting structure 46 and a cutting plate assembly 42, wherein the connecting structure 46 can be connected to a motor output shaft 442. The cutting plate assembly 42 includes a cutting head 422 and a plurality of blades 424, the plurality of blades 424 are installed on the cutting head 422, and the plurality of blades 424 are arranged at intervals along the circumferential direction of the cutting head 422 in sequence. The cutting head 422 is detachably connected to the connecting structure 46, and then the cutting head 422 is detachably connected to the connecting structure 46 so as to be connected to the motor output shaft 442.

Figure 23:
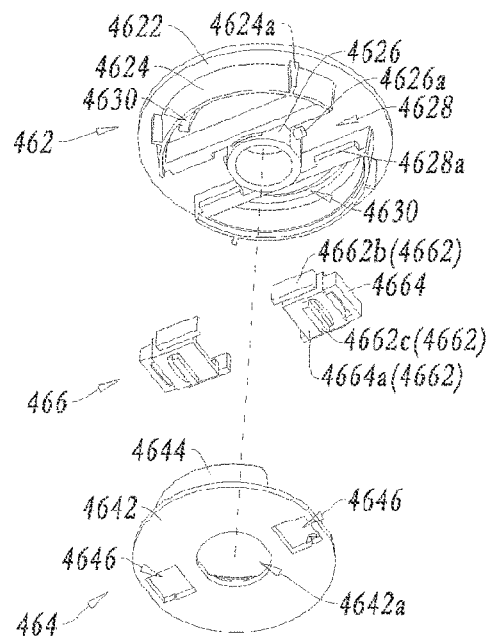
FIG. 23 is a first exploded view of a connecting assembly according to an embodiment of the present invention, wherein the biasing member is omitted.
Figure 24:
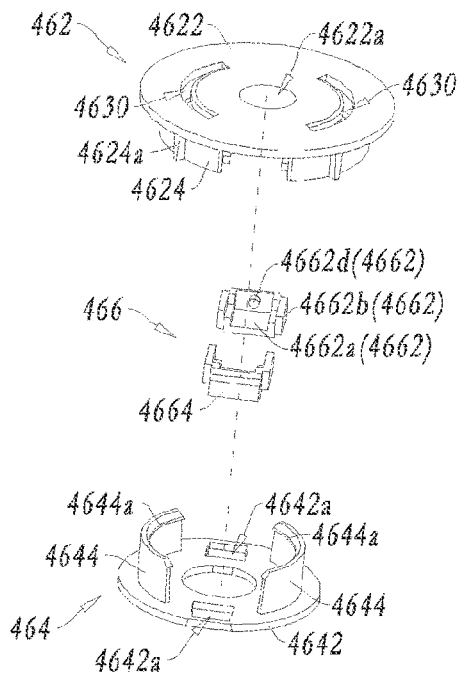
FIG. 24 is a second exploded view of a connecting assembly according to an embodiment of the present invention, wherein the biasing member is omitted.

Referring to FIGS. 23-24, the connecting structure 46 includes a first connecting member 462, a second connecting member 464, two movable members 466 and two biasing members 468, wherein the first connecting member 462 can be connected to the motor output shaft 442, and the second connecting member 464 is detachably connected to the first connecting member 462.

Referring to FIGS. 23-24, FIG. 26 and FIG. 6, as a whole, in the working component 4 provided in this embodiment, the first connecting member 462 includes a connecting plate 4622 configured with a shaft hole 4622aa, and a connecting vertical wall 4624 that takes the center of the shaft hole 4622*aa* as the axis and is configured on the connecting plate 4622. The second connecting member 464 includes a cover plate 4642 configured with a shaft hole 4642*a*, and a cover plate vertical wall 4644 that takes the center of the shaft hole 4642*a* as the axis and is configured on the cover plate 4642. The cutting head 422 includes a mounting plate 4222 configured with a mounting hole 4222*a*, and a cutting head vertical wall 4224 that takes the center of the mounting hole 4222*a* as the axis and is configured on the mounting plate 4222, wherein the shaft hole 4622*aa* of the connecting plate 4622, the shaft hole 4642*a* of the cover plate 4642 and the mounting hole 4222*a* of the mounting plate 4222 are all coaxial, the motor output shaft 442 passes through the shaft hole 4622*aa* and the shaft hole 4642*a* in sequence, and the first connecting member 462 and the second connecting member 464 are defined in the mounting hole 4222*a*. Preferably, the connecting plate 4622, the cover plate 4642 and the mounting plate 4222 are all thin plate structures, the connecting vertical wall 4624 and the cover plate vertical wall 4644 are both arc-shaped thin wall structures, and the cutting head vertical wall 4224 is an annular shape thin wall structure.

In this embodiment, the connecting plate 4622 is configured with two connecting vertical walls 4624 arranged oppositely at intervals along the radial direction of the shaft hole 4622*aa*, and the cover plate 4642 is configured with two cover plate vertical walls 4644 arranged oppositely at intervals along the radial direction of the shaft hole 4642*a*. The two connecting vertical walls 4624 and the two cover plate vertical walls 4644 form one-to-one correspondence.

Along the radial direction of the motor output shaft 442, the cover plate vertical wall 4644, the connecting vertical wall 4624 and the cutting head vertical wall 4224 are arranged in sequence from the inside to the outside. The outer side edge of the connecting plate 4622 is wrapped by the cutting head vertical wall 4224, the outer surface of the connecting plate 4622 is flush with the top end of the cutting head vertical wall 4224, and the entire first connecting member 462 is wrapped in the cutting head vertical wall 4224. The shaft hole 4642*a* of the cover plate 4642 is flush with the shaft end of the motor output shaft 442, the cover plate 4642 covers the inner sides of the two connecting vertical walls 4624, and the entire second connecting member 464 is wrapped around the inner side of the first connecting member 462. Accordingly, in the radial direction of the motor output shaft 442, it is formed that the first connecting member 462 wraps the second connecting member 464, and the cutting head 422 wraps the first connecting member 462. In the axial direction of the motor output shaft 442, the entire working component 4 is kept as flush as possible at the extreme positions of the two axial ends, so that the entire working component 4 is more tight and compact, is assembled accurately, and has high use safety.

In this embodiment, the cover plate vertical wall 4644 and the connecting vertical wall 4624 can be arranged at intervals or in contact with each other, the connecting vertical wall 4624 and the cutting head vertical wall 4224 are detachably sleeved, and the internal and external positions of the connecting vertical wall 4624 and the cutting head vertical wall 4224 can be interchanged according to the actual design.

In this embodiment, in the most preferred solution, the rotation center of the motor output shaft 442 coincides with the common axis of the shaft hole 4622*aa*, the shaft hole 4642*a* and the mounting hole 4222*a*.

Various components of the working component provided by the embodiment of the present invention will be described in detail below.

Referring to FIGS. 23-24, the first connecting member 462 is preferably an integrally formed structure. The first connecting member 462 includes a connecting plate 4622 and a sleeve 4626, as well as an operating slideway 4628, two connecting holes 4630 and two connecting vertical walls 4624, wherein the connecting plate 4622 is a disc-shaped thin plate provided with a shaft hole 4622*aa*, the sleeve 4626 and the shaft hole 4622*aa* are coaxially and vertically arranged on the connecting plate 4622, the motor output shaft 442 passes through the connecting plate 4622 and the sleeve 4626 in sequence from one side departing from the sleeve 4626, and the motor output shaft 442 is preferably in socket connection with the sleeve 4626 by interference fit. Two slideway side walls are arranged on the both sides of the sleeve 4626 relatively parallel and spaced apart along the radial direction of the sleeve 4626 and constitute the operating slideway 4628. Since the sleeve 4626 is located between the two slideway side walls, along the length direction of the operating slideway 4628, the sleeve 4626 separates the operating slideway 4628 into two separate slideways that radiate outwards along the radial direction of the sleeve 4626, the outer side ends of the two separate slideways are arranged as openings, and the top ends positions of the four side walls of the two separate slideways are configured with first protrusions 4628*a* protruding toward the center lines of the slideways. Furthermore, the outer side wall of the sleeve 4626 is configured with two first connecting columns 4626*a* protruding outwards along the radial direction of the sleeve 4626, and the two first connecting columns 4626*a* are respectively located in the two separate slideways.

The two connecting vertical walls 4624 are symmetrically arranged at intervals with the center of the shaft hole 4622*aa* of the connecting plate 4622 as the axis and along the radial direction of the sleeve 4626, the two connecting vertical walls 4624 are arranged in one-to-one correspondence with the two slideway side walls, and the two connecting vertical walls 4624 are located on the outer sides the side walls of the two operating slideways 4628. In this embodiment, the two ends of the connecting vertical wall 4624 are hermetically connected with the two ends of the side wall of the operating slideway 4628, and the side walls of the two connecting vertical walls 4624 and the two operating slideways 4628 are hermetically connected in the one-to-one correspondence manner to form two semicircular closed structures.

The connecting vertical wall 4624 can be vertically arranged on the connecting plate 4622, or obliquely arranged on the connecting plate 4622, wherein the connecting vertical wall 4624 can be inclined relative to the connecting plate 4622 as a whole, or the side wall of the connecting vertical wall 4624 matching the cutting head vertical wall 4224 is inclined relative to the connecting plate 4622, and the other side wall departing from the cutting head vertical wall 4224 can be arranged vertical to the connecting plate 4622.

Each connecting vertical wall 4624 is configured with a first connecting portion 4624*a* protruding or recessing from the side wall surface of the connecting vertical wall 4624, and the first connecting portion 4624*a* extends a certain length along the axial direction of the shaft hole 4622*aa*. In this embodiment, the first connecting portion 4624*a* is a strip-shaped protrusion. Along the axial direction of the shaft hole 4622*aa*, the width size of the strip-shaped protrusion is set to gradually change, and the top face of the strip-shaped protrusion is inclined relative to the axis of the shaft hole 4622aa to facilitate centering and improve the coaxiality of installation.

Specifically, along the power output direction of the motor output shaft 442, the width size of the strip-shaped protrusion gradually decreases. In this embodiment, each connecting vertical wall 4624 is configured with two first connecting portions 4624a, and the two first connecting portions 4624a are arranged at intervals along the length extension direction of the connecting vertical wall 4624. Four first connecting portions 4624a are arranged on the two connecting vertical walls 4624, and the four first connecting portions 4624a are rotationally symmetrical with respect to the connecting plate 4622. In this embodiment, the first connecting portion 4624a is arranged on the outer surface of the side wall of the connecting vertical wall 4624.

The two connecting holes 4630 are symmetrically arranged at intervals with the center of the shaft hole 4622aa of the connecting plate 4622 as the axis and along the radial direction of the sleeve 4626, the two connecting holes 4630 are correspondingly parallel to the two connecting vertical walls 4624 and are located on the inner sides of the two connecting vertical walls 4624. The two connecting holes 4630 pass through the thickness of the connecting plate 4622 and are located in the above-mentioned two closed structures. In this embodiment, on the side face of the connecting plate 4622 close to the motor, the outer edge of the connecting hole 4630 is chamfered or inclined.

The movable member 466 is an integrally formed structure. The two movable members 466 are slidably installed in the two separate slideways in the one-to-one correspondence manner, and the movable members 466 are configured to slidably translate along the length direction of the separate slideways. In this embodiment, the movable member 466 has a first state and a second state, and the movable member 466 can be driven by fingers to perform translational conversion between the first state and the second state. When the movable member 466 is in the first state, the connecting structure 46 and the cutting head 422 are connected and locked with each other via the movable member 466, and when the movable member 466 is in the second state, the connecting structure 46 and the cutting head 422 can be unlocked and disassembled from each other.

In this embodiment, when the movable member 466 changes from the first state into the second state, it moves toward a direction away from the cutting head 422. Preferably, the direction away from the cutting head is the direction close to the rotation center of the connecting structure 46. More preferably, when the movable member 466 changes from the first state into the second state, it performs translational movement toward the radial direction close to the rotation center of the connecting structure 46.

Each movable member 466 includes a moving portion 4662 and an association portion 4664 connected with the moving portion 4662, wherein the moving portion 4662 includes a moving portion body 4662a, an operating handle 4662c and two second protrusions 4662b. The two second protrusions 4662b are oppositely arranged on the both sides of the moving portion body 4662a along the width direction of the moving portion body 4662a, the two second protrusions 4662b form one-to-one correspondence with the two first protrusions 4628a, and then the moving portion 4662 is restricted in the separate slideway. The operating handle 4662c is arranged at the top end of the moving portion body 4662a, which is convenient for the operator to operate the movable member 466 via the operating handle 4662c. The moving portion body 4662a is provided with a proximal end portion and a distal end portion, the proximal end portion is arranged close to the sleeve 4626, the distal end portion is arranged close to the opening of the separate slideway, a second connecting column 4662d is arranged on the proximal end portion facing the side face of the sleeve 4626, and the association portion 4664 is connected with the distal end portion.

Referring to FIGS. 27-28 and FIGS. 29-30, the biasing member 468 is connected between the first connecting column 4626a and the second connecting column 4662d, the two biasing members 468 are arranged between the sleeve 4626 and the two moving portions 132 in the one-to-one correspondence manner, preferably, the biasing member 468 is configured such that the movable member 466 always has a trend to bias the cutting head 422 along the centrifugal direction of the cutting head 422, so that the biasing direction is consistent with the centrifugal direction of the cutting head 422. In this way, under the action of the biasing force of the two biasing members 468, the two moving portions 4662 respectively drive the two association portions 4664 to slide out from the openings of the two separate slideways and enter the cutting head vertical wall 4224. Or, under the action of an external force, the two moving portions 4662 respectively drive the two association portions 4664 to slide in from the openings of the two separate slideways and depart from the cutting head vertical wall 4224.

As a preferred solution, the cutting head 422 is coaxial with the connecting structure 46, and the cutting head 422 is detachably connected to the periphery of the connecting structure 46. Therefore, the centrifugal direction of the cutting head 422 is a direction departing from the rotation center shafts of the motor output shaft 442, the connecting structure 46 and the cutting plate assembly 42.

In this embodiment, the biasing member 468 is preferably an elastic component, and the elastic component is preferably a spring. It should be understood that the movable member 466 itself can have elasticity, and on this basis, the arrangement of the biasing member 468 can be eliminated. In this embodiment, the biasing member 468 is connected between the sleeve 4626 and the movable member 466, and the movable member 466 is arranged on the inner side of the cutting head 422. It should be understood that the movable member 466 can be arranged on the outer side of the cutting head 422 to provide a biasing force toward the cutting head 422 from outside to inside. In this embodiment, the biasing member 468 is arranged such that the movable member 466 always has a trend to bias the cutting head 422 along the centrifugal direction of the cutting head 422. It should be understood that the biasing member 468 can be arranged such that the movable member 466 always has a trend to bias the cutting head 422 along a direction departing from the centrifugal direction of the cutting head 422. The arrangement mode of the movable member 466 and the biasing direction of the biasing member 468 can be combined and selected according to specific requirements.

In this embodiment, the biasing member 468 is connected between the first connecting column 4626a and the second connecting column 4662d. It should be understood that the fixing of the two ends of the biasing member 468 can be realized in various ways. For example, a fixing plate extends out from the inner wall or the bottom wall of the slideway, and the end of the biasing member 468 close to the sleeve 4626 is fixed on the fixing plate. In this embodiment, the end of the biasing member 468 close to the sleeve 4626 is connected with the sleeve 4626. The extension direction of the biasing member 468 is consistent with the radial direction of the sleeve 4626, so as to ensure that the biasing member 468 provides a biasing trend the same as the centrifugal direction of the cutting head 422.

Referring to FIGS. 23-24, the second connecting member 464 is preferably an integrally formed structure. The second connecting member 464 includes a cover plate 4642, two cover plate vertical walls 4644, and two operating ports 4646 penetrating through the thickness of the cover plate 4642, wherein the cover plate 4642 is a disc-shaped plate with a shaft hole 4642a, the cover plate 4642 and the connecting plate 4622 are coaxially arranged, and the motor output shaft 442 passes through the connecting plate 4622, the sleeve 4626 and the cover plate 4642 in sequence from the side departing from the sleeve 4626. The outer side edge of the shaft hole 4642a of the cover plate 4642 is obliquely arranged, the outer side edge of the shaft end of the motor output shaft 442 is obliquely arranged, the outer side edge of the shaft hole 4642a of the cover plate 4642 matches the outer side edge of the shaft end of the motor output shaft 442, the cover plate 4642 is guided by the inclined surface to be sleeved on the shaft end part of the motor output shaft 442, which facilitates the accurate alignment of various components during the assembly process and improves the assembly accuracy.

The two cover plate vertical walls 4644 are both symmetrically arranged at intervals with the center of the shaft hole 4642aa of the cover plate 4642 as the axis and along the radial direction of the sleeve 4626, the two cover plate vertical walls 4644 are clamped with the two connecting holes 4630 in the one-to-one correspondence manner, and the two cover plate vertical walls 4644 form one-to-one correspondence with the two connecting vertical walls 4624 and are located in the above-mentioned two closed structures, so the second connecting member 464 is wrapped around the inner side of the first connecting member 462. The top of each of the two cover plate vertical walls 4644 is provided with a third connecting portion 4644a protruding along the side wall of the top end of the cover plate vertical wall 4644, the cover plate vertical wall 4644 passes through the connecting hole 4630 via the third connecting portion 4644a, and then is clamped with the outer side edge of the connecting hole 4630. Since the third connecting portion 4644a protrudes from the thickness direction of the cover plate vertical wall 4644, the width size of the connecting hole 4630 is equal to or greater than the sum of the thickness of the cover plate vertical wall 4644 and the height of the third connecting portion 4644a, so that the third connecting portion 4644a can smoothly pass through the connecting hole 4630.

In this embodiment, the third connecting portion 4644a is a continuous connecting portion extending along the length direction of the cover plate vertical wall 4644. It should be understood that the third connecting portion 4644a can be a plurality of intermittent connecting portions arranged along the length direction of the cover plate vertical wall 4644 in sequence at intervals, or is only a connecting portion that exists locally. In this embodiment, the third connecting portion 4644a protrudes toward the inner side along the radial direction of the cover plate 4642. It should be understood that the third connecting portion 4644a can protrude toward the outer side along the radial direction of the cover plate.

The operating ports 4646 pass through the cover plate 4642 along the thickness direction of the cover plate 4642, and the two operating ports 4646 are symmetrically arranged along the radial direction of the cover plate 4642 and correspond to the two separate slideways. The two operating handles 4662c on the two movable members 466 pass through the two operating ports 4646 upwards, the length direction of the operating port 4646 is consistent with the length direction of the separate slideway, and the operator operates the operating handle 4662c, so that the operating handle moves along the length direction of the operating port 4646 so as to drive the association portion 4664 to enter and exit via the opening of the separate slideway. In this embodiment, along the circumferential direction of the cover plate 4642, the two cover plate vertical walls 4644 and the two operating ports 4646 are alternately arranged in sequence.

Figure 25:
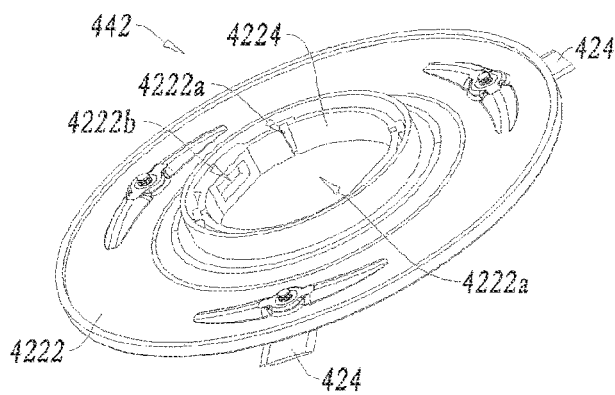
FIG. 25 is a schematic view of a cutting plate assembly according to an embodiment of the present invention.
Figure 30:
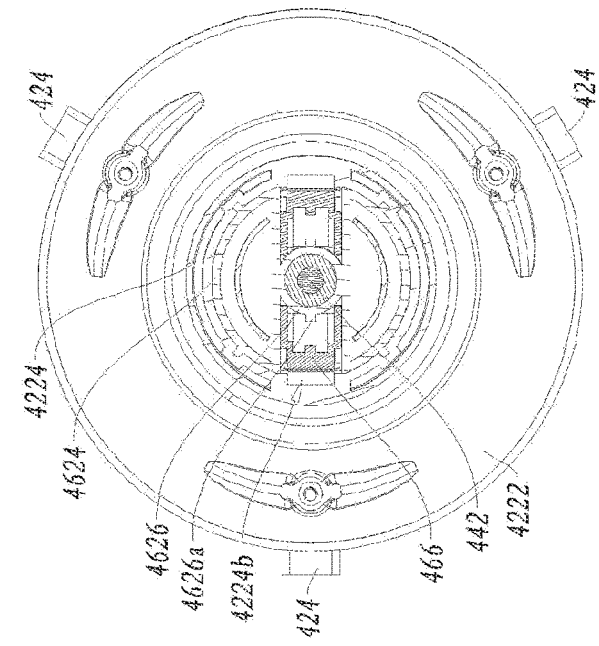
FIG. 30 is an enlarged view of section X6-X6 of FIG. 27, wherein the movable member is disengaged from the socket groove.

Referring to FIG. 25, the cutting head 422 is preferably an integrally formed structure. In one embodiment, the cutting head 422 includes a mounting plate 4222 and two cutting head vertical walls 4224, wherein the mounting plate 4222 is a disc-shaped plate provided with a mounting hole 4222a, the two cutting head vertical walls are both annular vertical walls with the center of the mounting hole 4222a of the mounting plate 4222 as the axis, and one cutting head vertical wall 4224 is arranged on the outer side of the other cutting head wall 4224 at intervals.

The cutting head vertical wall 4224 located on the inner side is provided with a second connecting portion 4224a protruding or recessing along the side wall surface of the cutting head vertical wall 4224, and the second connecting portion 4224a extends a certain length along the axial direction of the shaft hole 4642a. In this embodiment, the second connecting portion 4224a is a strip-shaped groove, and the strip-shaped groove extends from the inner side face of the cutting head vertical wall 4224 toward the outer side groove. Along the axial direction of the mounting hole 4222a, the width size of the strip-shaped groove is set to gradually change, and the bottom surface of the strip-shaped groove is inclined relative to the axis of the mounting hole 4222a to facilitate centering and improve the coaxiality of installation.

Specifically, along the power output direction of the motor output shaft 442, the width size of the strip-shaped groove gradually decreases. In this embodiment, the cutting head vertical wall 4224 located on the inner side is provided with four second connecting portions 4224a, and the four second connecting portions 4224a are arranged at intervals along the circumferential direction of the cutting head vertical wall 4224.

Figure 29:
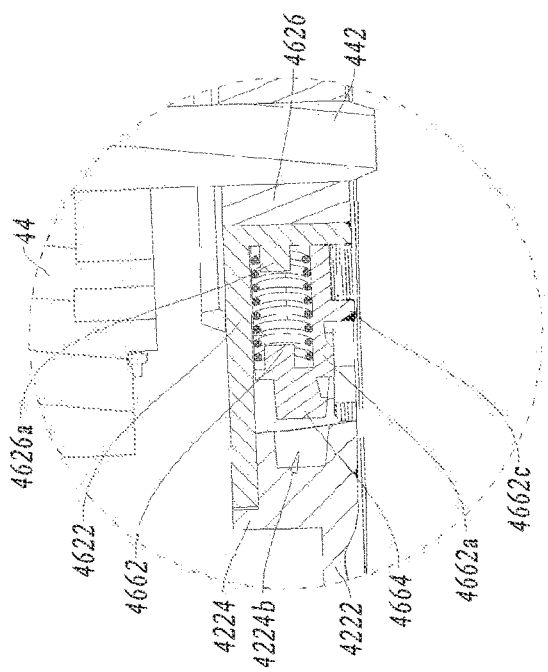
FIG. 29 is an enlarged view of section X of FIG. 27, wherein the movable member is disengaged from the socket groove.

The cutting head vertical wall 4224 located on the inner side is further provided with two socket grooves 4224b recessing outwards along the radial direction of the mounting hole 4222a, and the two socket grooves 4224b are arranged oppositely along the radial direction of the mounting plate 4222. In addition, the two socket grooves 4224b are arranged corresponding to the two openings of the two separate slideways, and the movable member 466 is configured to slide out from the slideway via the opening of the separate slideway and to be set in the socket groove 4224b (as shown in FIG. 27, in which the movable member is inserted into the socket groove) by operably driving the association portion 4664 via the moving portion 4662, or the movable member 466 is configured to slide into the slideway from the opening of the separate slideway and depart from the socket groove 4224b (as shown in FIG. 29, in which the movable member is inserted into the socket groove) by operably driving the association portion 4664 via the moving portion 4662. In this embodiment, along the radially outward direction of the mounting hole 4222a, the socket groove 4224b is arranged such that the cross section gradually decreases, wherein the above-mentioned four second connecting portions 4224a are all evenly and symmetrically arranged on the both sides of the two socket grooves 4224b.

In this embodiment, the first connecting portion 4624a is a strip-shaped protrusion, and the second connecting portion 4224a is a strip-shaped slot. It should be understood that one of the first connecting portion 4624a and the second connecting portion 4224a is a strip-shaped protrusion, and the other of the first connecting portion 4624a and the second connecting portion 4224a is a strip-shaped groove. Furthermore, according to the selection of the specific structures of the first connecting portion 4624a and the second connecting portion 4224a, the gradient directions of the first connecting portion 4624a and the second connecting portion 4224a are adaptively set to satisfy the purpose of smoothly connecting the mounting plate 4222 to the connecting plate 4622.

In another embodiment, the two cutting head vertical walls 4224 can be integrally formed into one with no gap therebetween, so as to further simplify the structure of the cutting head 422.

The cutting head vertical wall 4224 can be vertically arranged on the mounting plate 4222 or obliquely arranged on the mounting plate 4222, wherein the cutting head vertical wall 4224 can be inclined relative to the mounting plate 4222 as a whole, or the side wall matching the connecting vertical wall 4624 on the cutting head vertical wall 4224 is inclined relative to the mounting plate 4222, and the other side wall departing from the connecting vertical wall 4624 can be arranged vertical to the mounting plate 4222.

Figure 31:
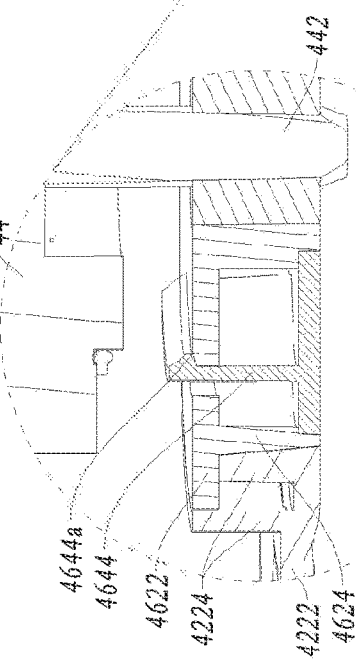
FIG. 31 is an X5-X5 sectional view of FIG. 26, wherein the combined surfaces of the first and second connecting portions are shown.

As shown in FIG. 31, the top face of the strip-shaped protrusion and the bottom surface of the strip-shaped slot are arranged such that a junction surface formed by the butt joint therebetween is inclined relative to the axis of the sleeve 4626, so as to achieve the purpose of precise centering. For example, in this embodiment, the connecting vertical wall 4624 is arranged vertical to the connecting plate 4622, the cutting head vertical wall 4224 located on the inner side is arranged vertical to the mounting plate 4222, the top face of the strip-shaped protrusion and the bottom surface of the strip-shaped slot are arranged such that the junction surface formed by the butt joint therebetween gradually approaches to the center axis of the entire mechanism along the output direction of the motor output shaft 442, which can not only ensure the smooth connection of the mounting plate 4222 to the connecting plate 4622, but also can improve the alignment accuracy of the mounting plate via the junction surface.

Or, in other embodiments, the connecting vertical wall 4624 gradually inclines toward the center of the connecting plate 4622 along the output direction of the motor output shaft 442, the cutting head vertical wall 4224 located on the inner side gradually inclines toward the center of the mounting plate 4222 along a direction opposite to the output direction of the motor output shaft 442, the junction surface formed by the buttjoint between the top face of the strip-shaped protrusion and the bottom surface of the strip-shaped slot gradually departs from the center axis of the entire mechanism along the output direction of the motor output shaft 442, which can not only ensure the smooth connection of the mounting plate 4222 to the connecting plate 4622, but also can improve the alignment accuracy of the mounting plate via the junction surface.

The present embodiment further provides a cutting head 422, which is configured to be detachably connected to the motor output shaft 442. In this embodiment, the cutting head 422 is detachably connected to the aforementioned connecting structure 46 to be connected to the motor output shaft 442.

In this embodiment, the cutting head 422 is provided with a plurality of blades 424 arranged at intervals along the circumferential direction of the cutting head 422 in sequence, the blades 424 can be connected by screws or bolts, and the blades 424 are fixed and pressed on the cutting head 422 by pressing plates.

Figure 32:
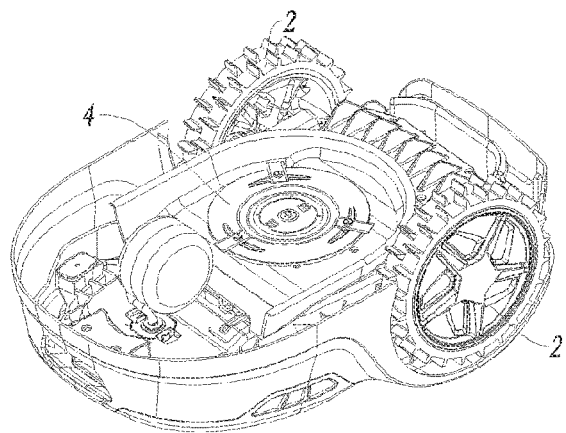
FIG. 32 is a schematic view of the autonomous working apparatus in FIG. 2 with the bottom side facing upwards.

Referring to FIG. 32, the autonomous working apparatus M of this embodiment is provided with a motor, the motor is provided with a motor output shaft 442, and the connecting plate 4622 in the connecting structure 46 of the working component 4 is sleeved on the motor output shaft 442 via a sleeve 4626. Preferably, the sleeve 4626 is sleeved on the motor output shaft 442 via interference fit. In another embodiment, the sleeve 4626 can also be fixedly connected to the motor output shaft 442 in manners such as screw connection. In this embodiment, the cutting head 422 can be connected to the connecting structure 46 without tools (with bare hands), and the working component 4 can be connected to the motor output shaft 442 without tools.

In the autonomous working apparatus provided by this embodiment, the working component is installed below a cutting head floating mechanism, and can be driven by the cutting head floating mechanism to float up and down. Due to its compact structure, the operating space in the axial direction of a driving motor is extremely small, and it is difficult to apply a force in the axial direction, and the force applied in the axial direction can easily damage the cutting head floating mechanism. The above-mentioned problems can be solved by adopting the structure of the present invention.

The working component provided by this embodiment has a simple and compact structure, a light weight and a small volume, and can be easily assembled with bare hands. In the working component, the movable member therein only moves along the radial direction of the output shaft, the biasing member provides a biasing force to realize the connection, there is no need to provide other driving parts that output power from the axial direction of the output shaft, so there is no need to provide an operating space extending along the axial direction of the output shaft in the working component, in this way, the entire working component is very compact in both radial and axial directions. The entire working component is assembled by thin plates and thin walls by clamping, and can be disassembled and assembled without tools.

The tool-free disassembly and assembly method of the working component provided in this embodiment will be described in detail below: Method 1: placing the surface of the cutting head of the autonomous working apparatus away from the motor upwards, holding the cutting head with both hands along the radial direction of the cutting head, dragging the cutting head downwards with the index fingers upwards, pushing and pressing the movable members inwards along the radial direction of the cutting head at the same time with two thumbs, pressing the connecting assembly downwards at the same time, and disassembling the connecting assembly from the cutting head by applying forces upwards with two index fingers. Method 2: making the axis of the working component horizontal, clamping the cutting head with one hand, pushing and pressing the movable member inwards along the radial direction of the cutting head at the same time by using the index finger and the thumb of the other hand, and disassembling the connecting assembly from the cutting head along the horizontal direction by applying opposite horizontal forces along the axis of the working component by the both hands.

Due to the intelligent working characteristics of intelligent apparatus, it has more strict sealing requirements. A part of threaded holes in the apparatus need to meet the requirements of cable passing and waterproofness and dustproofness at the same time. In the prior art, a sealing component is usually installed in the threaded hole by using a plurality of screws, and then a cable passes through the threaded hole on the sealing component. The assembly process of the plurality of screws is cumbersome. In use, the apparatus is driven by a driving portion of the apparatus to run and generates vibration inevitably, therefore the screws are easy to loosen or fall, and the fitting between the cable and the threaded hole is not tight, therefore impurities may easily enter the inside of the apparatus via fitting gaps.

Referring to FIG. 5, the lower chassis cover 11 is located below the upper chassis cover and is buckled with the upper chassis cover to form an internal space M1 that requires strict waterproofness and dustproofness and an external space M2 that requires no waterproofness and dustproofness. A part of the external space M2 for mounting a cutting head height adjustment mechanism of the autonomous working apparatus M is located below the lower chassis cover 11, it is inevitable that a to-be-sealed hole 112 needs to be formed on the lower chassis cover 11, and the to-be-sealed hole 112 satisfies the requirements of cable passing and waterproofness and dustproofness via a sealing device 6. In this embodiment, preferably, the lower chassis cover 11 is a structure provided with the to-be-sealed hole 112.

As shown in FIG. 5, in the autonomous working apparatus M provided in this embodiment, a motor accommodating cavity 52 is arranged in an area close to one end along the length direction. The motor accommodating cavity 52 is used for accommodating the cutting motor of the cutting part of the autonomous working apparatus M, so it is inevitably necessary to form a to-be-sealed hole 112 on the side wall or the top wall for wiring. The motor accommodating cavity 52 is provided with an opening that opens toward the lower side, the output shaft of the cutting motor extends out from the opening from above downwards, and a cutting knife set of the cutting part is installed on the output shaft of the cutting motor, wherein, as shown in FIG. 5, an upper space and a side space located at the outside of the motor accommodating cavity 52 belong to the above-mentioned internal space M1, so it is necessary to seal the to-be-sealed hole 112 on the side wall or the top wall via the sealing device 6. In this embodiment, the to-be-sealed hole 112 is formed on the bottom wall of the motor accommodating cavity 52.

In this embodiment, the outer edges of the lower chassis cover 11 and the motor accommodating cavity 52 are both configured with protrusions 114 that take the center of the to-be-sealed hole 112 as the axis and extend along the circumferential direction from the outer edge of the to-be-sealed hole 112, and the sealing device 6 is in extrusion matching with the protrusion 114, so that the sealing property of the to-be-sealed hole 112 is further ensured.

Figure 34:
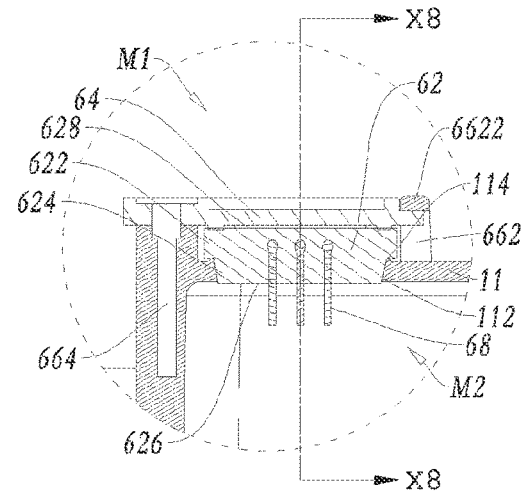
FIG. 34 is an X7-X7 sectional view of FIG. 33.
Figure 33:
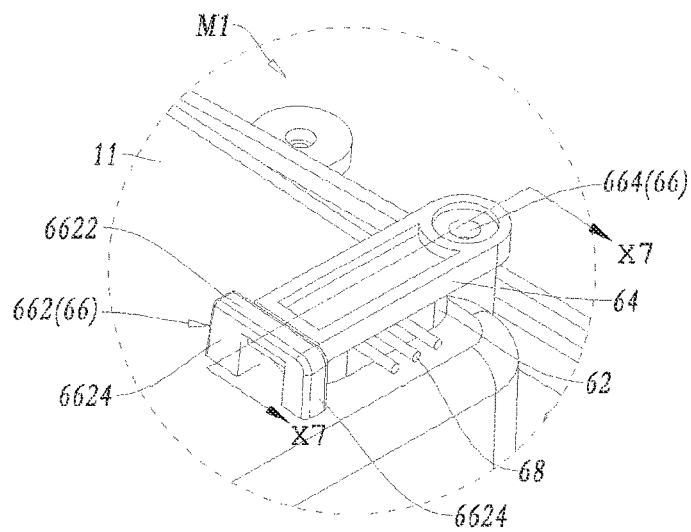
FIG. 33 is an enlarged view of part A2 in FIG. 5.
Figure 35:
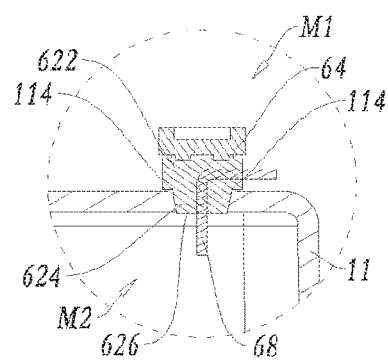
FIG. 35 is an X8-X8 sectional view of FIG. 34.

The sealing device 6 provided by the preferred embodiment of the utility model will be described in detail below based on the lower chassis cover 11 described above. Referring to FIGS. 33-35, the sealing device 6 provided by this preferred embodiment includes a sealing block 62, a pressing plate 64, a pressing plate fastening structure 66 and a conducting cable 68, wherein the sealing block 62 is a cuboid structure with chamfers. Along the thickness direction of the sealing block 62, the sealing block 62 has an outer end face 628 and an inner end face 626, which are opposite to each other, the inner end face 626 is pressed into the to-be-sealed hole 112 on the lower chassis cover 11, and the outer end face 628 is in contact with the pressing plate 64. In this embodiment, the sealing block 62 has elasticity, and is preferably an elastic block, such as a rubber block. The sealing block 62 is in interference fit with the to-be-sealed hole 112, and the elastic deformation of the sealing block 62 further ensures the good sealing property of the to-be-sealed hole 112. However, it should be understood that the shape of the sealing block 62 is not limited to the above-mentioned structure, and can also be a cylinder with a certain thickness, an elliptical cylinder, or the like.

The cross section of the sealing block 62 remains unchanged, gradually changes as a whole, gradually changes partially or changes in a stepping manner from the outer end face 628 to the inner end face 626. The radial size of the to-be-sealed hole 112 remains unchanged, gradually changes as a whole, gradually changes partially or changes in the stepping manner, and the radial size setting matches the cross section setting of the sealing block 62. In one embodiment, the cross section of the sealing block 62 remains unchanged from the outer end face 628 to the inner end face 626, the radial size of the to-be-sealed hole 112 remains unchanged, and the sealing block 62 and the to-be-sealed hole 112 are press-fitted by interference fit. In one embodiment, the sealing block 62 includes a first section and a second section, which are sequentially arranged from the outer end face 628 to the inner end face 626, wherein the cross section of the first section remains unchanged, the cross section of the second section remains unchanged, and the cross section of the second section is smaller than the cross section of the first section. The radial size of the to-be-sealed hole 112 remains unchanged, the sealing block 62 is press-fitted in the to-be-sealed hole 112 via the second section, and a tilt section between the first section and the second section is press-fitted on the outer edge of the to-be-sealed hole 112. Of course, in the same direction, the to-be-sealed hole 112 can include a first section and a second section, which are arranged in sequence, the cross section of the first section remains unchanged, the cross section of the second section remains unchanged, the cross section of the second section is smaller than the cross section of the first section, the first section of the sealing block 62 is press-fitted with the first section of the to-be-sealed hole 112, and the second section of the sealing block 62 is press-fitted with the second section of the to-be-sealed hole 112. In one embodiment, the cross section of the sealing block 62 close to the outer end face 628 gradually decreases toward the cross section close to the inner end face 626 as a whole. In the same direction, the radial size of the to-be-sealed hole 112 gradually increases. Since the cross section of the sealing block 62 close to the inner end face 626 tends to be the smallest, the sealing block 62 can be pressed into the to-be-sealed hole 112 of the lower chassis cover 11 via the inner end face 626.

In this embodiment, as shown in FIGS. 33-34, the sealing block 62 includes a first section 622 and a second section 624, which are sequentially arranged from the outer end face 628 to the inner end face 626, wherein the cross section of the first section 622 remains unchanged from the outer end face 628 to the inner end face 626, and the cross section of the second section 624 gradually decreases from the outer end face 628 to the inner end face 626. The maximum cross section of the second section 624 is smaller than the cross section of the first section 622, so that a tilt section is formed between the first section 622 and the second section 624. In the same direction, the overall radial size of the to-be-sealed hole 112 gradually increases, the outer surface of the first section 622 is matched and press-fitted with the inner wall of the to-be-sealed hole 112, the tilt section is press-fitted on the outer edge of the to-be-sealed hole 112, so that the sealing block 62 is firmly press-fitted in the to-be-sealed hole 112. Preferably, the outer edge of the to-be-sealed hole 112 is provided with a protrusion 114 that takes the center of the to-be-sealed hole 112 as the axis and extends along the circumferential direction from the outer edge of the to-be-sealed hole 112, and the tilt section of the sealing block 62 extrudes the protrusion, so that the sealing property of the to-be-sealed hole 112 is further ensured.

The conducting cable 68 is arranged in the sealing block 62, and the sealing block 62 respectively extends out from the both ends of the conducting cable 68 at a position close to the outer end face 628 and on the inner end face 626. In this embodiment, preferably, the conducting cable 68 is integrally formed in the sealing block 62, and the conducting cable 68 is in non-clearance fit with the sealing block 62. The first end of the conducting cable 68 extends out the sealing block 62 from the inner end face 626, the second end of the conducting cable 68 extends out the sealing block 62 from the surface of the first section 622, and the conducting cable 68 is arranged at an angle in the sealing block 62. A plurality of conducting cables 68 are arranged in the sealing block 62, and the plurality of conducting cables 68 are arranged at intervals along the length direction of the sealing block 62 in sequence. The pressing plate 64 is a cuboid plate structure, the pressing plate 64 is in contact with the outer end face 628 of the sealing block 62, and the two ends of the pressing plate 64 in the length direction are the first end and the second end, respectively. The pressing plate fastening structure 66 is arranged on the lower chassis cover 11 and is used for fastening the pressing plate 64, so that the pressing plate 64 presses against the outer end face of the sealing block 62. The pressing plate fastening structure 66 includes a first fastening structure 662 and a second fastening structure 664, the first fastening structure 662 and the second fastening structure 664 are respectively located at the both ends of the pressing plate 64 in the length direction, and are arranged in one-to-one correspondence with the first end and the second end of the pressing plate 64.

In a preferred solution of this embodiment, the first end of the pressing plate 64 is a pressing end head extending along the length direction of the pressing plate 64, and the second end of the pressing plate 64 is a connecting hole penetrating through the thickness of the pressing plate 64. The first fastening structure 662 is a lug structure integrally formed on the lower chassis cover 11. The lug structure is provided with a pressing cantilever 6622 and two symmetrical connecting arms 6624 bending and extending out from the two ends of the pressing cantilever 6622 in the length direction, wherein the end portions of the two connecting arms 6624 away from the pressing cantilever 6622 are integrally connected with the lower chassis cover 11. The second fastening structure 664 includes a threaded hole that is formed on the second end of the pressing plate 64 and passes through the thickness of the pressing plate 64, a column hole that is formed on the lower chassis cover 11 and extends a certain length along the thickness direction of the lower chassis cover 11, and a detachable member that is detachably connected to the threaded hole and the column hole along the axial directions of the threaded hole and the column hole. In this embodiment, preferably, the threaded hole is an unthreaded hole or a threaded hole, the column hole is preferably a threaded column hole, and the detachable member is preferably a threaded component, such as a screw or a double-screw bolt. During specific installation, the inner end face 626 of the sealing block 620 is pressed into the to-be-sealed hole 112 at first, then the first end of the pressing plate 64 is inserted into the first fastening structure (the lug structure) 301, the other end of the pressing plate 64 is pressed down, so that the threaded hole on the second end is approximately coaxial with the column hole on the lower chassis cover 11, and a screws or double-screw bolt spirally passes through the threaded hole and the column hole from above downwards, at this time, the pressing plate 64 presses against the outer end face of the sealing block 62, and then tightly presses the second section 624 of the sealing block 3144 into the to-be-sealed hole.

As an alternative embodiment of the above-mentioned preferred solution, the pressing cantilever 6622 in the first fastening structure 662 can be connected to the lower chassis cover 11 via a connecting arm 6624 arranged only at one end in the length direction. Or, the first fastening structure 662 has various alternative structures such as L-shape, S-shape, Z-shape and C-shape. As an alternative embodiment of the above-mentioned preferred solution, both the threaded hole and the column hole in the second fastening structure 301 can be unthreaded holes, and a latch pin passes through the threaded hole and the column hole to fasten the second end of the pressing plate 64.

It should be understood that at least one of the first fastening structure 662 and the second fastening structure 664 can be replaced with other structures configured with the pressing cantilevers 6622. For example, the second fastening structure 664 in the preferred solution of this embodiment is replaced with other structures configured with the pressing cantilevers 6622, or both the first fastening structure 662 and the second fastening structure 664 in the preferred solution of this embodiment are replaced with other structures configured with the pressing cantilevers 6622. Optionally, the first fastening structure 662 in the preferred solution of this embodiment is replaced with an inverted U-shaped lock or an inverted L-shaped lock. Or, the first fastening structure 662 and the second fastening structure 664 in the preferred solution of this embodiment can be replaced with inverted U-shaped locks or inverted L-shaped locks at the same time. Optionally, the first end and the second end of the pressing plate 64 are both pressing end heads extending along the length direction of the pressing plate 64, and both the first fastening structure 662 and the second fastening structure 664 are provided with pressing cantilevers 6622 arranged on the lower chassis cover 11, wherein the first fastening structure 662 is preferably a lug structure that is integrally formed on the lower chassis cover 11, and the second fastening structure 664 is preferably an inverted U-shaped lock rotatably connected with the lower chassis cover 11. One end of the inverted U-shaped lock is rotatably connected to the lower chassis cover 11, and the other end can be pressed into a locking lug that is integrally formed on the lower chassis cover 11. The pressing cantilever 6622 of the first fastening structure 662 is located above the first end of the pressing plate 64 and presses the pressing plate 64 along the thickness direction of the pressing plate 64. The inverted U-shaped lock has elasticity, is buckled on the second end of the pressing plate 64 reversely, and is pressed into the locking lug by generating elastic deformation, so that the first pressing plate fastening structure 661 and the second pressing plate fastening structure 662 cause the pressing plate 64 to press against the outer end face 628 of the sealing block 62 all the time. However, it should be understood that the second fastening structure 664 can also be an inverted L-shaped lock.

The sealing device provided in this embodiment uses at most one threaded component, which reduces the use of threaded components, thereby reducing the labor cost of assembly process. From the perspective of cost, the threaded component is a separate standard component, which needs to be purchased at a cost, and the lug structure integrally arranged on the lower chassis cover or the motor accommodating portion does not need to be purchased at a separate cost, thereby reducing the material cost.

It should be understood that although this specification is described in terms of embodiments, not each embodiment contains only one separate technical solution, the specification is described in this way only for the sake of clarity and those skilled in the art should take the specification as a whole and the technical solutions in each embodiment can be suitably combined to form other embodiments that can be understood by those skilled in the art. The series of detailed descriptions set out above are only specific to a feasible embodiment of the invention and are not intended to limit the scope of protection of the invention; any equivalent embodiment or variation that does not depart from the spirit of the art of the invention shall be included within the scope of protection of the invention.

The invention claimed is:

1. Autonomous working apparatus, comprising:
   a main body mechanism, a moving mechanism, a working mechanism and a control module, wherein
   the main body mechanism comprises a support body, and the working mechanism is configured to be installed on the support body;
   the working mechanism comprises an operating member and a height variable mechanism;
   the height variable mechanism is configured to be movably connected with the operating member;
   the operating member is configured to be rotatably connected to the support body, and the operating member is configured to operatably drive the height variable mechanism to move along the height adjustment direction;
   a force between said operating member and said height variable mechanism is caused by a weight of said height variable mechanism and a force between said operating member and said support body is caused by a weight of said operating member and of said height variable mechanism, the height variable mechanism is movably connected to the support body, and the movable connection is configured to allow the height variable mechanism to move along a height adjustment direction and prevent the height variable mechanism from rotating with the operating member; and
   the height variable mechanism is hinged with the support body.

2. The autonomous working apparatus according to claim 1, wherein the operating member comprises a first part arranged above the support body and a second part arranged below the support body, the first part is configured to press downwardly on the support body; and the height variable mechanism is configured to press downwardly on the second part.

3. The autonomous working apparatus according claim 1, wherein when the operating member is configured to operatably rotate relative to the support body, the height variable mechanism can move relative to the support body and/or the operating member along the height adjustment direction.

4. The autonomous working apparatus according to claim 1, wherein the height variable mechanism comprises a height adjustment mechanism and a height-to-be-adjusted mechanism, the height adjustment mechanism is configured to be connected with the height-to-be-adjusted mechanism; at least one of the height adjustment mechanism and the height-to-be-adjusted mechanism is configured to be movably connected to the support body; and the operating member is configured to be movably connected to the height adjustment mechanism, and the operating member is configured to operatably drive the height adjustment mechanism and thus drive the height-to-be-adjusted mechanism to move along the height adjustment direction.

5. The autonomous working apparatus according to claim 4, wherein the height adjustment mechanism is configured to comprise a connecting member, the connecting member is configured to be movably connected with the support body, and a height adjustment portion is arranged on the connecting member; the height-to-be-adjusted mechanism is configured to be connected with at least one of the connecting member and the height adjustment portion; and the operating member is configured to be movably connected with the height adjustment portion, and the operating member is configured to operatably drive the height adjustment mechanism and thus drive the height adjustment portion to move along the height adjustment direction.

6. The autonomous working apparatus according to claim 5, wherein the connecting member is configured to comprise a first end and a second end, the first end is configured to be hinged with the support body, and the second end is configured to be connected with the height-to-be-adjusted mechanism.

7. The autonomous working apparatus according to claim 4, wherein:
   one of the operating member and the height adjustment mechanism is configured to comprise a height adjustment portion;
   the height adjustment portion is configured to be an annular shape, and a circumferential surface of the height adjustment portion is configured to include a carrying surface extending along a circumferential direction and varying in height;
   the other of the operating member and the height adjustment mechanism is configured to comprise a height adjustment protrusion portion, and the height adjustment protrusion portion is configured to extend along a radial direction of the height adjustment portion; and
   one of the height adjustment protrusion portion and the carrying surface is configured to press downwardly on the other, and the operating member is configured to operatably drive one of the height adjustment protrusion portion and the carrying surface to move relative to the other.

8. The autonomous working apparatus according to claim 7, wherein the height adjustment mechanism is configured to comprise the height adjustment portion, and the carrying surface faces downward.

9. The autonomous working apparatus according to claim 8, wherein:
   the height adjustment portion is configured to comprise a groove portion and an end wall, which are arranged on the circumferential surface and extend along an axial direction of the height adjustment portion;
   the groove portion is configured that a bottom surface of the groove portion is away from a center of the height adjustment portion, and a top surface of the end wall is close to the center of the height adjustment portion; and the carrying surface is configured to extend toward the end wall from the groove portion with a trend of increasing height.

10. The autonomous working apparatus according to claim 7, wherein:
the support body and/or the height adjustment portion is configured to comprise a stop block, and the carrying surface is configured to comprise a spacing structure arranged between a starting end and a termination end of the carrying surface; and
the stop block is configured to be arranged corresponding to the spacing structure along the height adjustment direction or is configured to be arranged in the spacing structure, and the stop block is located on a rotation path of the operating member for preventing the operating member from entering the spacing structure via the starting end or the termination end.

11. The autonomous working apparatus according to claim 7, wherein the carrying surface is configured to comprise at least two level sections and at least one tilt section, and the at least two level sections and the at least one tilt section are configured to be alternately connected in sequence along a length direction of the carrying surface.

12. The autonomous working apparatus according to claim 1, wherein the supporting body is configured to comprise a limiting elastic member; one of the operating member and the limiting elastic member is configured to comprise a limiting slot, and the other one of the operating member and the limiting elastic member is configured to comprise a limiting protrusion; and the limiting slot and the limiting protrusion are configured to be located on the same circumference, and the limiting slot is configured to be able to receive the limiting protrusion.

13. The autonomous working apparatus according to claim 1, wherein:
the height variable mechanism comprises a height adjustment mechanism and a height-to-be-adjusted mechanism, and the height adjustment mechanism is configured to be connected with the height-to-be-adjusted mechanism;
the operating member is configured to be movably connected to the height adjustment mechanism, and the operating member is configured to operatably drive the height adjustment mechanism and thus drive the height-to-be-adjusted mechanism to move along a height adjustment direction; and
a center axis of the height adjustment mechanism and a center axis of the height-to-be-adjusted mechanism are spaced apart along a horizontal direction.

14. The autonomous working apparatus according to claim 1, wherein the support body is configured to comprise a mounting portion, the mounting portion is configured to comprise a cavity, and the cavity is configured to have an opening;
the main body mechanism is configured to comprise a mount seat, and the mount seat is configured to be set in and/or depart from the cavity via the opening; and
the height variable mechanism is configured to be movably connected to a fourth connecting portion of the mount seat.

15. The autonomous working apparatus according to claim 1, further comprising a working component, wherein the working component is configured to comprise a cutting plate assembly, a cutting motor and a connecting structure; the connecting structure is configured to be connected to the motor output shaft of the cutting motor; and the cutting plate assembly is configured to be detachably connected to the connecting structure.

16. The autonomous working apparatus according to claim 15, wherein:
the connecting structure is configured to comprise a first connecting member connectable to a motor output shaft and a movable member movably installed on the first connecting member;
the movable member is configured to have a first state and a second state; and
the connecting structure and the cutting plate assembly are configured to be connected and locked when the movable member is in the first state, and able to be disassembled when the movable member is in the second state.

17. The autonomous working apparatus according to claim 16, wherein the movable member is configured to move in a direction approaching to the rotation center of the connecting structure when changing from the first state into the second state, and to move in a direction away from the rotation center of the connecting structure when changing from the second state into the first state.

18. The autonomous working apparatus according to claim 1, wherein the main body mechanism is configured to have at least one to-be-sealed hole; the autonomous working apparatus further comprises a sealing device; the sealing device is configured to comprise a sealing block, a pressing plate and a pressing plate fastening structure; the sealing block is configured to have an outer end face and an inner end face, which are opposite to each other, and the inner end face is configured to be pressed into the to-be-sealed hole; the pressing plate is configured to touch the outer end face; and the pressing plate fastening structure is configured to fasten the pressing plate, so that the pressing plate presses against the outer end face.

* * * * *